United States Patent
Diefenbach et al.

(10) Patent No.: US 10,221,264 B2
(45) Date of Patent: Mar. 5, 2019

(54) ACTIVATOR COMPOSITIONS, THEIR PREPARATION, AND THEIR USE IN CATALYSTS

(71) Applicant: W. R. Grace & Co.-Conn., Columbia, MD (US)

(72) Inventors: Steven P. Diefenbach, Baton Rouge, LA (US); Min Li, Baton Rouge, LA (US); Matthew Grant Thorn, Baton Rouge, LA (US); Lubin Luo, Houston, TX (US)

(73) Assignee: W. R. Grace & Co.-Conn., Columbia, MD (US)

( * ) Notice: Subject to any disclaimer, the term of this patent is extended or adjusted under 35 U.S.C. 154(b) by 393 days.

(21) Appl. No.: 14/396,915

(22) PCT Filed: Mar. 14, 2013

(86) PCT No.: PCT/US2013/031537
§ 371 (c)(1),
(2) Date: Oct. 24, 2014

(87) PCT Pub. No.: WO2013/162745
PCT Pub. Date: Oct. 31, 2013

(65) Prior Publication Data
US 2015/0105238 A1    Apr. 16, 2015

Related U.S. Application Data

(60) Provisional application No. 61/639,206, filed on Apr. 27, 2012.

(51) Int. Cl.
*C08F 210/16*    (2006.01)
(52) U.S. Cl.
CPC ........ *C08F 210/16* (2013.01); *C08F 2410/01* (2013.01)

(58) Field of Classification Search
None
See application file for complete search history.

(56) References Cited

U.S. PATENT DOCUMENTS 7,700,699 B2 *  4/2010  Hagerty .................. C08F 10/00
526/160

FOREIGN PATENT DOCUMENTS

EP        0 003 836 A1    9/1979
WO        2012/071205 A2  5/2012

OTHER PUBLICATIONS

Schellenberg et al. Macromolecular Rapid Communication, 2005, 26, 1299-1303.*
Yury V. Kissin ET L; "AlR 2 Cl/MgR 2 combinations as universal cocatalysts for Ziegler-Natta, metallocene, and post-metallocene catalysts", Journal of Polymer Science Part A: Polymer Chemistry, vol. 47, No. 13, Jul. 1, 2009, pp. 3271-3285, XP55026784, ISSN: 0887-624X, DOI: 10.1002/pola.23391 table 6, p. 3728, first column, second paragraph, scheme 1, p. 3278.

* cited by examiner

*Primary Examiner* — Yun Qian
(74) *Attorney, Agent, or Firm* — Charles A. Cross

(57) ABSTRACT

This invention provides activator precursor compositions and activator compositions. The activator precursor compositions are formed from a support material, a linking compound, and polyfunctional compounds having at least two aromatic groups in which at least two of said aromatic groups each has at least one polar moiety thereon. The activator compositions are formed from a support material, a linking compound, an aluminoxane, and a polyfunctional compound having at least two aromatic groups in which at least two of said aromatic groups each has at least one polar moiety thereon. Also provided are catalyst compositions, processes for forming catalyst compositions, and polymerization processes utilizing the catalyst compositions of this invention.

11 Claims, No Drawings

ACTIVATOR COMPOSITIONS, THEIR PREPARATION, AND THEIR USE IN CATALYSTS

REFERENCE TO RELATED APPLICATIONS

This application is the National Stage of International Patent Application No. PCT/US2013/031537 filed on Mar. 14, 2013, which in turn claims the benefit of U.S. Provisional Patent Application No. 61/639,206, filed on Apr. 27, 2012, the disclosures of which are incorporated herein by reference in their entirety.

TECHNICAL FIELD

This invention relates to new activator precursor compositions, activator compositions, their preparation, and their use in catalysts for olefin polymerization.

BACKGROUND

Partially hydrolyzed aluminum alkyl compounds, known as aluminoxanes (also called alumoxanes), are effective in activating metallocenes for polymerization of olefins. Methylaluminoxane (also called methylalumoxane) has become the aluminum co-catalyst of choice in the industry. It is available commercially in the form of 10 to 30 wt % solutions in an aromatic solvent, typically toluene.

Considerable effort has been devoted to improving the effectiveness of catalyst systems for polymerization of olefins based on use of aluminoxanes or modified aluminoxanes. In this connection, WO 2009/029857 shows dimethylaluminum cation formation from methylaluminoxane upon treatment of methylaluminoxane with a Lewis base. e.g., tetrahydrofuran, in a toluene solution. Lewis base stabilized dialkylaluminum cations can also be derived from non-aluminoxane sources and used as metallocene catalyst activators; see for example Klosin et al., WO 2000/011006, and *Organometallics*, 2000, 19, 4684-4686. When a methylaluminoxane is reacted with a metallocene, a metallocene-dialkylaluminum cation forms, for example, $[Cp_2Zr(\mu\text{-Me})_2AlMe_2]^+$ or $[Cp_2Ti(\mu\text{-Me})_2AlMe_2]^+$. See in this connection Babushkin and Brintzinger, *J. Am. Chem. Soc.,* 2002, 124, 12869-12873, and Sarzotti et al., *J. Polymer Sci. A*, 2007, 45, 1677-1690, which describe activation of a zirconocene catalyst precursor by methylaluminoxane; also see Bryliakov, Talsi, and Bochmann, *Organometallics,* 2004, 23, 149-152, which describes activation of a titanocene catalyst precursor by methylaluminoxane.

Silica-supported methylaluminoxane is currently a preferred commercial metallocene catalyst activator. However, silica-supported methylaluminoxane can only activate a small amount of metallocene, resulting a relatively low efficiency for such systems. Low efficiency is believed to be caused by a need for a large excess of methylaluminoxane (e.g., an atomic ratio of Al:Zr greater than 400:1) to effectively activate the metallocene molecules, and/or by the small amount of methylaluminoxane that can be supported on standard grades of silica (e.g., <20% Al).

Improvements to aluminoxanes are continually sought in the art, particularly to increase their stability and/or activation efficiencies.

SUMMARY OF THE INVENTION

This invention relates to novel activator precursor compositions and activator compositions, which provide catalyst systems having high efficiency. Such compositions typically are stable under inert, anhydrous conditions, and are usually in solid form. In addition to these desirable features, the compositions of the invention also perform significantly better than typical supported aluminoxanes when used as cocatalysts in the polymerization of olefins. More particularly, the resulting activator compositions of this invention interact with metallocenes to yield highly active catalyst systems.

An embodiment of this invention is an activator precursor composition, which comprises
  i) a support material in contact with a linking compound, and
  ii) a polyfunctional compound.

The polyfunctional compounds have at least two aromatic groups, and at least two of the aromatic groups each have at least one polar monoprotic group thereon.

Another embodiment of this invention is an activator composition comprising an aluminoxane and an activator precursor composition described above.

Also provided by this invention are processes for forming activator precursor compositions, activator compositions, and catalyst compositions, as well as catalyst compositions, polymerization processes utilizing the catalyst compositions of this invention, and polymers formed thereby.

These and other embodiments and features of this invention will be still further apparent from the ensuing description and appended claims.

FURTHER DETAILED DESCRIPTION OF THE INVENTION

It is preferred that the components used in forming the activator precursor compositions and activator compositions as well as the resultant activator precursor compositions and activator compositions themselves be handled in an inert, moisture-free, oxygen free environment such as argon, nitrogen, or helium because of the sensitivity of such components and compositions to moisture and oxygen.

Operations involving forming and/or handling of the activator precursor compositions of this invention and the activator compositions of this invention are usually performed in an inert, anhydrous environment. Typically, the inert, anhydrous environment is an anhydrous liquid hydrocarbon solvent, preferably an aromatic hydrocarbon. Suitable aliphatic hydrocarbons include, but are not necessarily limited to, isobutane, butane, pentane, hexane, cyclopentane, methylcyclopentane, cyclohexane, methylcyclohexane, heptane, cycloheptane, octane, isooctane, and the like. Aromatic hydrocarbons usually include one or more of benzene, toluene, xylene, mesitylene, ethylbenzene, diethylbenzene, 1,2,4-triethylbenzene, 1,3,5-triethylbenzene, amylbenzene, tetrahydronaphthalene, and the like. Mixtures of solvents may be used. Toluene is a particularly preferred aromatic solvent.

Compositions of the Invention

The components described herein are used in forming the activator precursor compositions and activator compositions of the invention. It is to be understood that the components, when part of an activator precursor composition or activator composition of the invention, are not in the same form as they were before they became part of the activator precursor composition or the activator composition, although the compositions are generally described herein in terms of unmodified components. For example, the linking compounds may form linking moieties, and the polyfunctional compounds may form polyfunctional groups comprising at least two aromatic groups, in which at least two of the aromatic groups each have at least one polar group thereon.

Activator Precursor Compositions

Activator precursor compositions of the invention are comprised of i) a support material in contact with a linking compound, sometimes referred to herein as a linking-treated support, and ii) a polyfunctional compound which has at least two aromatic groups in which at least two of said aromatic groups each have at least one polar monoprotic group thereon. The support material, linking compound, and polyfunctional compound are as described below, although it is to be understood that these components may not be in the same form as they were before they became part of the activator precursor composition. Activator precursor compositions of this invention can be produced by the processes described below.

Support Material

The support material can be organic or inorganic. Support materials used in the practice of this invention may be any finely divided inorganic solid support, such as talc, clay, silica, alumina, silica-alumina, magnesium chloride, or mixtures thereof, or a particulate resinous support material such as spheroidal, particulate, or finely-divided polyethylene, polyvinylchloride, polystyrene, or the like. Preferred support materials are inorganic particulate solid catalyst supports or carrier materials such as magnesium halides, or the like, and particularly inorganic oxides, aluminum silicates, or inorganic compositions containing inorganic oxides, such as kaolinite, attapulgite, montmorillonite, illite, bentonite, halloysite, and similar refractory clays. More preferred support materials are inorganic oxides, especially silica, alumina, and silica-alumina. Particularly preferred as the support material is particulate silica, especially porous particulate silica. Inorganic oxides that may be employed either alone or in combination with silica, alumina, or silica-alumina are magnesia, titania, zirconia, and the like.

Optionally, the support material may be fully or, preferably, partially dehydrated to remove water. The support material may be dehydrated by heating at 100 to 1000° C., preferably 100° C. to about 600° C., for a period of 1 to about 100 hours, preferably about 3 to about 24 hours. The treatment may be carried out in a vacuum or while purging with a dry inert gas such as nitrogen. As an alternative, the support material may be chemically dehydrated. Chemical dehydration is accomplished by slurrying the support in an inert low boiling solvent such as, for example, heptane, in a moisture- and oxygen-free atmosphere, in the presence of a dehydrating agent such as for example, trimethylaluminum.

For combination with the linking compound, the support should have reactive polar groups (functional groups), which typically have electron rich donor sites such as halogen, oxygen, sulfur, phosphorus, and nitrogen heteroatoms, or are sites containing one or more of these atoms, as well as double bonds. Examples of such polar groups include, but are not limited to, —OH groups, —NH groups, —SH groups, highly strained rings containing heteroatoms (e.g., those from the high temperature (~600 to 1000° C.) calcined support material that forms moieties such as four-member —Si—O—Si—O— rings), carbonyl groups, carbon-carbon double bonds, and the like. Generally, the polar groups are those that can form IUPAC standard sigma bonds upon reaction with the linking compound.

The support material can serve as a template to regulate the particle sizes of the activator precursor compositions and/or activator compositions, which in turn influences catalyst and polymer morphologies. Thus, the specific particle size of the support material is frequently taken into consideration in choosing a support material. A suitable support such as silica typically will have a particle diameter in the range of 0.1 to 600 microns, preferably in the range of 0.3 to 100 microns; a surface area in the range of 50 to 1000 m²/g, preferably in the range of 100 to 500 m²/g; and a pore volume in the range of about 0.3 to 5.0 cc/g, preferably in the range of 0.5 to 3.5 cc/g. It is also desirable to employ supports with pore diameters in the range of about 50 to about 500 angstroms.

Linking Compound

The linking compound is a compound that links the support to the polyfunctional compound. The linking compound may be an organometallic or a non-organometallic compound, with the proviso that the organometallic compound does not contain aluminum.

An organometallic compound is one where the metal is directly bonded to a carbon atom. A non-organometallic compound is one where the metal is directly bonded to a heteroatom.

One embodiment of an organometallic compound is represented by the formula:

$$MR^1{}_sQ_{t-s}$$

wherein M represents a metal atom selecting from Mg, Sc, Y, Ti, Zr, Hf, V, Nb, Ta, Zn, B, Ga, In, Sn and mixtures thereof; $R^1$ may be the same or different and represents a $C_1$-$C_{20}$ hydrocarbyl group, wherein the beta carbon of the hydrocarbyl group may be replaced by Si; Q represents a hetero-atom or a hetero-atom containing organic group where the heteroatom is directly bonded to M via the heteroatom; t stands for the valence of M and s is a number such that $2 \leq s \leq t$.

Preferably, M is Mg, Ti or Zn. Also, preferably t is 2, 3, 4, 5 or 6, or 2, 3, 4 or 5.

Non-limiting examples of heteroatoms that may be used in Q are halogens (e.g., fluorine, chlorine, bromine), oxygen, nitrogen, sulfur, phosphorus, etc.

Non-limiting examples of the organic group that may be used in Q are hydrocarbyl or hydrocarbyl groups substituted with or containing heteroatoms.

Examples of the hydrocarbyl group represented by $R^1$ or the organic group in Q for the above formula include alkyl, cycloalkyl and aryl groups containing from 1 to 18 carbons, or 1 to 12 carbons or 1 to 7 carbons, more specifically, methyl, ethyl, propyl, butyl, amyl, hexyl, decyl, cyclohexyl, phenyl, and benzyl.

Illustrative, but non-limiting examples of organometallic compounds with s=t which may be suitably employed include are dialkyl magnesiums such as dimethylmagnesium, diethylmagnesium, dipropylmagnesiums, di-isopropylmagnesium, di-n-butylmagnesium, ethylbuytlmagnesium, butyloctylmagnesium, and the like; diarylmagnesiums such as dibenzylmagnesium, ditolylmagnesium and dixylylmagnesium, alkylalkoxy magnesium such as ethyl magnesium ethoxide and the like; dialkylzinc such as dimethylzinc, diethylzinc, dipropylzine, di-isopropylzinc, di-n-butylzinc, di-isobutylzinc, and the like; diarylzincs such as dibenzylzinc, ditolylzinc and dixylylzinc, and the like; trialkylgallium or trialkylindium such as trimethylgallium, trimethylindium, triethylgallium, triethylindium, and the like; tetraalkyl titaniums such as tetrabenzyl titanium, tetramethyltitanium, tetraethyl titanium, tetrapropyl titanium and the like; tetraalkyltin such as tetraethyltin, tetrapropyltin, tetrabutyltin; tetraalkyltitanium containing Si in the alpha or beta position of $R^1$ such as tetrakis(trimethylsilyl)titanium (Ti(SiMe$_3$)$_4$), tetrakis(trimethylsilylmethyl)titanium (Ti(CH$_2$SiMe$_3$)$_4$; pentaalkyltantalum such as pentakis(trimethylsilylmethyl)tantalum and its derived thermodynamic product tris(trimethylsilylmethyl)tantalum carbene ((Me$_3$SiCH$_2$)$_3$Ta=CH$_2$).

Illustrative, but non-limiting examples of organometallic compounds with s<t which may be suitably employed include are dialkylaluminum species (s=2, t=3), such as dimethylaluminum fluoride, dimethylaluminum chloride, dimethylaluminum bromide, diethylaluminum fluoride, diethylaluminum chloride, diethylaluminum bromide, diisobutylaluminum fluoride, diisobutylaluminum chloride, diisobutylaluminum bromide, dimethylaluminum methoxide, diethylaluminum ethoxide, diisobutylaluminum isobutoxide, dimethylaluminum phenoxide, diethylaluminum phenoxide, diisobutylaluminum phenoxide; dialkyltitanium species (s=2, t=4), such as dibenzyltitanium difluoride, dibenzyltitanium dichloride, dibenzyltitanium dibromide, bis(trimethylsilyl)titanium difluoride, bis(trimethylsilyl)titanium dichloride, and bis(trimethylsilyl)titanium dibromide; trialkylatitanium species (s=3, t=4), such as trimethyltitanium fluoride, trimethyltitanium chloride, triethyltitanium fluoride, triethyltitanium chloride, triisobutyltitanium fluoride, triisobutyltitanium chloride; and the likes. When more than one R$^1$ are present, each R$^1$ can be the same or different; when more than one Q are present, the Q can be the same or different. In other words, more than one MR$^1_s$Q$_{t-s}$ (a MR$^1_s$Q$_{t-s}$ mixture) can be used.

Preferably, MR$^1_s$Q$_{t-s}$ is MgEt$_2$, MgEtBu, MgBu$_2$, MgBuOct, MgOct$_2$, ZnMe$_2$, ZnEt$_2$, or Zr(CH$_2$Ph)$_4$, wherein Et=ethyl, Bu=butyl, Me=methyl, oct=octyl, Ph=phenyl.

One embodiment of the non-organometallic compound is represented by the formula:

$$M^1Q^1_t$$

wherein M$^1$ represents a metal atom selecting from Mg, Al, Sc, Y, Ti, Zr, Hf, V, Nb, Ta, Cr, Mo, W, Mn, Fe, Co, Ni, Cu, Zn, B Ga, In, Al, Si, Ge, Sn, La, Ce, Er, Yb, Lu and mixtures thereof; Q$^1$ may be the same or different and represents a heteroatom or a heteroatom containing organic group where said heteroatom or heteroatom containing group is directly bonded to M$^1$ via the heteroatom; t stands for the valence of M$^1$ and t is greater than or equal to 2.

Preferably, M$^1$ is Mg, Al, Ti, Zr, Hf, Nb, Ta, or Cr or Zn. Also, Preferably t is 2, 3, 4, 5 or 6, or preferably 2, 3, 4 or 5.

Non-limiting examples of heteroatoms that may be used in Q$^1$ are halogens (e.g., fluorine, chlorine, bromine), oxygen, nitrogen, sulfur, phosphorus, etc.

Non-limiting examples of the organic group that may be used in Q$^1$ when Q$^1$ is the said heteroatom containing organic group containing oxygen, nitrogen, sulfur, phosphorus, are hydrocarbyl or hydrocarbyl groups substituted with or containing heteroatoms.

Examples of the hydrocarbyl group in Q$^1$ include alkyl, cycloalkyl and aryl groups, containing from 1 to 18 carbons, or 1 to –12 carbons or 1 to 7 carbons, more specifically, methyl, ethyl, propyl, butyl, iso-propyl, iso-butyl, tertiary-butyl, amyl, hexyl, decyl, cyclohexyl, phenyl, 2,6-dimethylphenyl, 2-ethylhexanoyl, trifluoromethanesulfonyl, and benzyl.

Illustrative, but non-limiting examples of non-organometallic compounds of the type M$^1$Q$^1_t$ which may be suitable employed are Ti[N(CH$_3$)$_2$]$_4$, Ti[N(CH$_2$CH$_3$)$_2$]$_4$, TiCl$_3$, TiF$_4$, TiCl$_4$, TiBr$_4$, TiI$_4$, Ti(OCH$_2$CH$_2$CH$_2$CH$_3$)$_4$, Ti(OCH$_2$CH$_3$)$_4$, Ti[OC(CH$_3$)$_3$]$_4$, Ti[OOCCH(C$_2$H$_5$)CHC$_4$H$_9$]$_4$, Ti[OCH(CH$_3$)$_2$]$_4$, Ti[OC$_6$H$_5$]$_4$, Ti[OC$_6$H$_3$-2,6-(CH$_3$)$_2$]$_4$, Ti(SO$_3$CF$_3$)$_4$, Zr[N(CH$_3$)$_2$]$_4$, Zr[N(CH$_2$CH$_3$)$_2$]$_4$, Zr[N(CH$_3$)(CH$_2$CH$_3$)]$_4$, ZrF$_4$, ZrCl$_4$, ZrBt$_4$, ZrI$_4$, Zr(OCH$_2$CH$_2$CH$_3$)$_4$, Zr(OCH$_2$CH$_3$)$_4$, Zr[OC(CH$_3$)$_3$]$_4$, Zr[OOCCH(C$_2$H$_5$)CHC$_4$H$_9$]$_4$, Zr[OCH(CH$_3$)$_2$]$_4$, Zr(OCH$_2$CH$_2$CH$_3$)$_4$, Zr[OC$_6$H$_5$]$_4$, Zr[OC$_6$H$_3$-2,6-(CH$_3$)$_2$]$_4$, Hf[N(CH$_3$)$_2$]$_4$, Hf[N(CH$_2$CH$_3$)$_2$]$_4$, Hf[N(CH$_3$)(CH$_2$CH$_3$)]$_4$, HfCl$_4$, HfBr$_4$, HfI$_4$, Hf(OCH$_2$CH$_2$CH$_2$CH$_3$)$_4$, Hf(OCH$_2$CH$_3$)$_4$, Hf[OC(CH$_3$)$_3$]$_4$, Hf[OCH(C$_2$H$_5$)CHC$_4$H$_9$]$_4$, Hf[OCH(CH$_3$)$_2$]$_4$, Hf(OCH$_2$CH$_2$CH$_3$)$_4$, Hf[OC$_6$H$_5$]$_4$, Hf[OC$_6$H$_3$-2,6-(CH$_3$)$_2$]$_4$, VCl$_3$, VBr$_3$, VOF$_3$, VCl$_4$, VOCl$_3$, VO[OCH(CH$_3$)$_2$]$_3$, Nb[N(CH$_3$)$_2$]$_5$, NbF$_5$, NbCl$_5$, NbBr$_5$, NbI$_5$, Nb[OOCCH(CH$_2$CH$_3$)CH$_2$CH$_2$CH$_2$CH$_3$]$_4$, Ta[N(CH$_3$)$_2$]$_5$, Ta{[(NC(CH$_3$)$_3$][N(C$_2$H$_5$)$_2$]$_3$}, TaF$_5$, TaCl$_5$, TaBr$_5$, TaI$_5$, Ta(OCH$_3$)$_5$, Ta(OCH$_2$CH$_3$)$_5$, ZnF$_2$, ZnCl$_2$, ZnBr$_2$, ZnI$_2$, B[N(CH$_3$)$_2$]$_3$, BF$_3$, BCl$_3$, BBr$_3$, BI$_3$, B[OCH(CH$_3$)$_2$]$_3$, B[OSi(CH$_3$)$_3$]$_3$, Al[N(CH$_3$)$_2$]$_3$, AlF$_3$, AlCl$_3$, AlBr$_3$, AlI$_3$, Al(OC$_4$H$_9$)$_3$, Al(OCH$_2$CH$_3$)$_3$, Al(OCH$_2$CH$_2$CH$_3$)$_3$, Al[OCH(CH$_3$)$_2$]$_3$, Al[OCH$_2$(C$_2$H$_5$)CHC$_4$H$_9$]$_3$, Ga[N(CH$_3$)$_2$]$_3$, GaF$_3$, GaCl$_3$, GaBr$_3$, GaI$_3$, InF$_3$, InCl$_3$, InBr$_3$, InI$_3$, GeF$_4$, GeCl$_4$, GeBr$_4$, GeI$_4$, Ge(OCH$_2$CH$_3$)$_4$, 2,2,4,4,6,6-hexamethylcyclotrisilazane, hexamethyldisilazane, SiCl$_4$, SiBr$_4$, SiI$_4$, Si(OCH$_3$)$_4$, Si(OCH$_2$CH$_3$)$_4$, Si(OCH$_2$CH$_2$CH$_3$)$_4$, Si(OCH$_2$CH$_2$CH$_2$CH$_2$CH$_2$CH$_2$CH$_2$CH$_2$CH$_2$CH$_3$)$_4$, Si(O((CH$_2$)$_{17}$CH$_3$))$_4$ hexamethylcyclotrisiloxane, hexamethyldisiloxane, SnF$_2$, SnCl$_2$, SnBr$_2$, SnI$_2$, SnF$_4$, SnCl$_4$, SnBr$_4$, SnI$_4$, Sn(OCH$_2$CH$_3$)$_4$, Sn(OCH$_2$CH$_2$CH$_3$)$_4$, Sn[OC(CH$_3$)$_3$]$_4$, Sb[N(CH$_3$)$_2$]$_3$, SbF$_3$, SbCl$_3$, SbBr$_3$, SbI$_3$, Sb(OCH$_2$CH$_3$)$_3$, Sb(OCH$_2$CH$_2$CH$_3$)$_3$, MgF$_2$, MgCl$_2$, MgBr$_2$, MgI$_2$, Mg(OCH$_2$CH$_3$)$_2$, Mg[OOCCH(CH$_2$CH$_3$)CH$_2$CH$_2$CH$_2$CH$_3$]$_2$, Mg(SO$_3$CF$_3$)$_2$, ScF$_3$, ScCl$_3$, Sc(SO$_3$CF$_3$)$_3$, YF$_3$, YCl$_3$, Y[OCH(CH$_3$)$_2$]$_3$, Y(SO$_3$CF$_3$)$_3$, CrF$_2$, CrF$_3$, CrCl$_2$, CrCl$_3$, Cr[OOCCH(CH$_2$CH$_3$)CH$_2$CH$_2$CH$_2$CH$_3$]$_3$, Cr(NO$_3$)$_3$, MoCl$_3$, MoOCl$_4$, MoCl$_5$, WCl$_4$, WCl$_6$, MnF$_2$, MnCl$_2$, MnBr$_2$, MnI$_2$, Mn[OOCCH(CH$_2$CH$_3$)CH$_2$CH$_2$CH$_2$CH$_3$]$_2$, MnF$_3$, FeF$_2$, FeCl$_2$, FeBr$_2$, FeF$_3$, FeCl$_3$, FeBr$_3$, CoF$_2$, CoCl$_2$, Co[OOCCH(CH$_2$CH$_3$)CH$_2$CH$_2$CH$_2$CH$_3$]$_2$, NiF$_2$, NiCl$_2$, NiBr$_2$, NiI$_2$, Ni(SO$_3$CF$_3$)$_2$, CuF$_2$, CuCl$_2$, CuBr$_2$, CII$_2$, Cu(OCH$_3$)$_2$, Cu(SO$_3$CF$_3$)$_2$, LaF$_3$, LaCl$_3$, LaBr$_3$, LaI$_3$, La[OCH(CH$_3$)$_2$]$_3$, CeF$_3$, CeCl$_3$, CeBr$_3$, CeI$_3$, Ce(SO$_3$CF$_3$)$_3$, ErCl$_3$, ErI$_3$, Er[OCH(CH$_3$)$_2$]$_3$, YbF$_3$, YbCl$_3$, Yb[OCH(CH$_3$)$_2$]$_3$, LuCl$_3$, Lu(SO$_3$CF$_3$)$_3$.

Preferably, M$^1$Q$^1_t$ is MgCl$_2$, MgF$_2$, AlCl$_3$, AlF$_3$, SiCl$_4$, SiMeCl$_3$, SiMe$_2$Cl$_2$, Ti(OEt)$_4$, Ti(OBu)$_4$, Ti(NMe$_2$)$_4$, Ta(NMe$_2$)$_5$ or Zr(NMe$_2$)$_4$.

One embodiment of the linking compound is a mixture of an organoaluminum compound with the organometallic compound, or a mixture of an organoaluminum compound with said non-organometallic compound.

As used throughout this document, the term "organoaluminum compound" refers to compounds of the formula $Z_{3-f}AlR_f$, in which Al is aluminum;

R is a hydrogen atom or a group bound to aluminum via a carbon atom (usually a hydrocarbyl group);

Z is an atom or group that is bound to aluminum via a non-carbon atom; and f is a number from 2 to 3.

Suitable organoaluminum compounds that may be used in the practice of this invention include, but are not limited to, trimethylaluminum, triethylaluminum, dimethylethylaluminum, diethylmethylaluminum, tri-n-propylaluminum, triisopropylaluminum, tri-n-butylaluminum, triisobutylaluminum, diisobutylethylaluminum, tri-tert-butyl aluminum, tri-3-methylbutyl aluminum, tripentylaluminum, tricyclopentyl aluminum, tri-n-hexylaluminum, triisohexylaluminum, tris(3-methylpentyl)aluminum, tris(4-methylpentyl)aluminum, tris(2-methylhexyl)aluminum, tris(3-methylhexyl)aluminum, tris(2-ethylhexyl)aluminum, tricyclohexylaluminum, tris(methylcyclohexyl)aluminum, triheptylaluminum, tri-n-octylaluminum, tri-n-decylaluminum, tridodecylaluminum, tris(tetradecyl)aluminum, tris(hexadecyl)aluminum, tris(octadecyl)aluminum, triphenylaluminum, ditolylaluminum hydride, tritolylaluminum, tris(3,5-dimethylphenyp)aluminum, tris(2,4-diisopropylphenyl)aluminum, tris(biphenylyl)-aluminum, dimethyl(phenyl)aluminum, ethyl-methyl-phenylaluminum, tri-α-naphthylaluminum, and tri-β-naphthylaluminum, as well as mixtures of two or more of the foregoing compounds.

Polyfunctional Compound

The polyfunctional compound has at least two aromatic groups, in which at least two of the aromatic groups each have at least one polar monoprotic group thereon. The aromatic groups can be homocyclic or heterocyclic, monocyclic or multicyclic. The polar monoprotic groups need not be sterically hindered, although hydrocarbyl groups can be present on the aromatic rings, including groups that sterically hinder the polar monoprotic group. Aromatic groups that do not have a polar monoprotic group can be present in the polyfunctional compound, so long as there are a minimum of two aromatic groups which do contain at least one polar monoprotic group in the molecule. The term "heterocyclic" as used herein refers to aromatic groups in which one or more heteroatoms (e.g., oxygen, sulfur, and/or nitrogen), preferably from one to four heteroatoms, more preferably one to two heteroatoms, are present. The aromatic rings can be multicyclic, either as fused rings (a moiety based on e.g., naphthylene) or rings, which are partially hydrogenated (a moiety based on e.g., tetrahydronaphthylene).

In some embodiments, homocyclic aromatic groups have six or more carbon atoms, preferably in the range of six to about 24 carbon atoms, and more preferably in the range of six to about fifteen carbon atoms. In other embodiments, the aromatic group is a heterocyclic aromatic moiety having five or more non-hydrogen atoms, in which one or more of the aromatic ring atoms is an element other than carbon, such as nitrogen, oxygen, or sulfur. When the aromatic rings are homocyclic, the polyfunctional compound generally has twelve to about sixty carbon atoms in the molecule, preferably about thirteen to about fifty-two carbon atoms, and more preferably about thirteen to about thirty carbon atoms.

In some embodiments of the invention, the polyfunctional compound can be represented by the formula $E(ArJH)_g$, where E is an organic moiety, an atom, or a bond;
Ar is an aromatic moiety;
J is a polar atom or a polar group;
H is a hydrogen atom;
g is an integer equal to or greater than 2;
and each ArJH can be same or different.

In the polyfunctional compound, the at least two aromatic groups each having at least one polar monoprotic group thereon can be linked by an organic moiety, an atom, or a bond. When these aromatic groups are linked by an organic moiety, the organic moiety has from one to about twenty carbon atoms, preferably one to about twelve carbon atoms, and can be an aliphatic or aromatic moiety. One or more heteroatoms can be present in the organic moiety, generally nitrogen, oxygen, or sulfur. Suitable organic moieties for joining the aromatic groups having the polar monoprotic groups thereon include, but are not limited to, methine, methylene, ethylene, propylidene, isopropylidene, butylidene, pentylidene, hexylidene, substituted or unsubstituted saturated cyclic moieties such as cyclohexylidene, substituted or unsubstituted phenylene, benzylic moieties (e.g., $C_6Me_3(CH_2—)_3$), and other substituted or unsubstituted aromatic moieties derived from benzene, naphthylene, anthracene, pyridine, and the like. Preferred organic moieties include aromatic moieties and methylene groups. When the aromatic groups having the polar monoprotic groups thereon are joined by an atom, it can be carbon, silicon, nitrogen, phosphorus, oxygen, or sulphur; preferably, a nitrogen atom or an oxygen atom. In the embodiments in which the polyfunctional compound is represented by the formula above, the organic moiety, bond, or atom linking the aromatic groups having the polar monoprotic groups thereon is represented by E.

Suitable homocyclic aromatic moieties for the aromatic groups with at least one polar monoprotic group thereon include substituted or unsubstituted aromatic moieties having structures based on benzene, naphthalene, anthracene, pyridine, pyrazine, furan, pyrrole, oxadiazole, thiazole, thiophene, indole, quinoline, and the like.

Suitable heterocyclic aromatic moieties for the aromatic groups with at least one polar monoprotic group thereon include substituted or unsubstituted aromatic moieties having structures based on pyridine, pyridazine, imidazole, pyrimidine, pyrazole, triazole, pyrazine, quinoline, isoquinoline, tetrazole, furan, thiene, isoxazole, thiazole, oxazole, isothiazole, pyrrole, indole, benzimidazole, benzofuran, cinnoline, indazole, indolizine, phthalazine, triazine, isoindole, purine, oxadiazole, thiadiazole, furazan, benzofurazan, benzothiophene, benzotriazole, benzothiazole, benzoxazole, quinazoline, quinoxaline, naphthyridine, dihydroquinoline, tetrahydroquinoline, dihydroisoquinoline, tetrahydroisoquinoline, benzofuran, furopyridine, pyrrolopyrimidine, and azaindole.

Monocyclic aromatic moieties are preferred; preferred monocyclic aromatic moieties include those based on benzene rings. Homocyclic aromatic moieties are also preferred.

Ar, in the above formula, is the aromatic portion corresponding to the aromatic rings of the aromatic groups having the polar monoprotic groups thereon. In other words, in some embodiments, ArJH represents the aromatic group with at least one polar monoprotic group thereon.

In the polyfunctional compound, the polar monoprotic group is a hydroxy group, a thiol group, or a secondary amino group; preferably a hydroxy group or a secondary amino group; more preferably a hydroxy group. When the polar monoprotic group is a secondary amino group (—NR'), R' is a hydrocarbyl group having one to about twenty carbon atoms, preferably one to about eight carbon atoms; and R' is preferably an alkyl group. Analogously, in the embodiments for which the above formula represents the polyfunctional compound, J is a polar atom or a polar group, including —O, —S, or —NR', preferably —O or —NR'; more preferably —O; where in R' is a hydrocarbyl group having one to about twenty carbon atoms, preferably one to about eight carbon atom; and R' is preferably an alkyl group. In the above formula, the polar monoprotic group of the polyfunctional compound is represented by JH. In these embodiments, although JH need not be sterically hindered, alkyl groups can be present in the aromatic groups, including alkyl groups that sterically hinder the polar monoprotic group.

Aromatic polyols are a preferred type of polyfunctional compound. While the polar monoprotic group need not be sterically hindered, alkyl groups can be present in the aromatic groups, including alkyl groups that sterically hinder the polar monoprotic group.

There are at least two aromatic groups each having at least one polar monoprotic group thereon in the polyfunctional compounds. The number of aromatic groups having at least one polar monoprotic group thereon is preferably in the range of 2 to about 6; more preferably in the range of 2 to about 4; especially preferred are polyfunctional compounds with 2 to about 3 aromatic groups each having at least one polar monoprotic group thereon are. Having more than 6 aromatic groups each having at least one polar monoprotic group thereon is within the scope of the invention.

For embodiments in which the polyfunctional compound is represented by the above formula, values for g in the range of 2 to about 6 are preferred; more preferred are values in the range of 2 to about 4; values in the range of 2 to about 3 are especially preferred. Values for g above 6 are possible. When g=2, E can be an atom-to-atom bond. For example, when the polyfunctional compound is 4,4'-diphenol, E is the bond between the two aromatic rings.

Suitable polyfunctional compounds in the practice of this invention in which the aromatic groups are homocyclic include 2,2'-diphenol, 4,4'-diphenol, 3,4'-diphenol, 2,2'-methylenebis(phenol), 4,4'-methylenebis-(phenol), 4,4'-ethylenediphenol, 2-(2-hydroxy-5-methylphenyl)-4-methylphenol, 6,6'-methylenebis(2-tert-butyl-4-methylphenol), 6,6'-(1-ethylidene)bis(2,4-di(tert-butyl)-phenol), 4,4'-methylenebis(2,6-di(tert-butyl)-phenol) (Ethanox® 4702 antioxidant, Albemarle Corporation), 4,4'-isopropylidenediphenol (bisphenol-A), 1,3,5-trimethyl-2,4,6-tris(3,5-di(tert-butyl)-4-hydroxybenzyl)benzene (Ethanox® 330 antioxidant, Albemarle Corporation), 1,1,2,2-tetrakis(p-hydroxyphenyl)ethane, 1,1'-bi-2-naphthol, 1,3,5-tri(6-hydroxy-2-naphthyl)benzene, 1-[2,6-bis(4-hydroxyphenyl)phenyl]phenol, 4'-n-butylamino-4-biphenylol, 2,2'-biphenyldi(methylamine), 2,4'-biphenyldi(methylamine), 1,1-binaphthyl-2,2'-di(methylamine), 4,4'-di(isopropylamino)-terphenyl, p,p'-di(ethylamino)quaterphenyl, biphenyl-4,4'-dithiol, and the like. Preferred polyfunctional compounds include 4,4'-ethylenediphenol, 4,4'-methylenebis(2,6-di(tert-butyl)-phenol), and 1,3,5-trimethyl-2,4,6-tris(3,5-di(tert-butyl)-4-hydroxybenzyl)benzene.

Polyfunctional compounds suitable in the practice of this invention in which at least one of the aromatic groups is heteroaromatic include 2,6-bis(4-hydroxyphenyl)pyridine, 3,5-bis(4-hydroxy-benzyl)pyridine, 6,6'-dihydroxy-2,2'-dipyridyl, 6,6''-dihydroxy-2,2':6',2''-terpyridine, 2-ethylamino-5-(2-hydroxyphenyl)-1,3,4-oxadiazole, 2-thiol-5-(2-hydroxyphenyl)-1,3,4-oxadiazole, 5-(4-methylaminophenyl)-1,3,4-oxadiazole-2-thiol, 2-hydroxy-4-(4-hydroxyphenyl)-thiazole, 5,5'-dihydroxy-2,2'-bithiophene, and the like.

Normally, the support material is contacted with a linking compound so that at least a portion of the linking compound residue (or linking moiety) contains M-R or $M^1$-$Q^1$ moieties, which can further react with the following polyfunctional compound.

By bringing the linking compound, support material, and polyfunctional compound into contact, the activator precursor compositions may be comprised of moieties formed from linking compounds, a support material, and moieties formed from polyfunctional compounds, which may be polyfunctional groups which have at least two aromatic groups in which at least two of said aromatic groups each has at least one polar moiety thereon.

The moieties formed from the polyfunctional compounds (polyfunctional groups) may have at least two aromatic rings in which at least two of the aromatic rings each has at least one polar moiety thereon. The aromatic groups can be homocyclic or heterocyclic, monocyclic or multicyclic. Generally, the polyfunctional group has twelve to about sixty carbon atoms, preferably about thirteen to about fifty-two carbon atoms, and more preferably about thirteen to about thirty carbon atoms. The polar moieties need not be sterically hindered, although alkyl groups can be present on the aromatic rings, including alkyl groups that sterically hinder the polar moieties. Another way of describing the polyfunctional group is as represented by the formula $E(ArJ-)_g$, where E is an organic moiety, an atom, or a bond;

Ar is an aromatic moiety;

J is a polar atom or a polar group;

g is an integer equal to or greater than 2;

and each ArJ- can be same or different.

E, Ar, J, g, and the preferences for each are as described below for the polyfunctional compounds. Similar to the polyfunctional compound above, while the polar moiety (J) need not be sterically hindered, alkyl groups can be present in the aromatic groups, including alkyl groups that sterically hinder the polar moiety. E can be an atom-to-atom bond. For example, when the polyfunctional group is 4,4'-diphenoxy, E is the bond between the two aromatic rings.

Suitable polyfunctional groups or moieties in the practice of this invention include 2,2'-diphenoxy, 4,4'-diphenoxy, 3,4'-diphenoxy, 2,2'-methylenebis(phenoxy), 4,4'-methylenebis(phenoxy), 4,4'-ethylenediphenoxy, 2-(5-methylphen-2-oxy)-4-methylphenoxy, 6,6'-methylenebis(2-tert-butyl-4-methylphenoxy), 4,4'-methylenebis(2,6-di(tert-butyl)phenoxy), 6,6-(1-ethylidene)bis(2,4-di(tert-butyl)phenoxy), 4,4'-methylenebis(2,6-di(tert-butyl)phenoxy), 4,4'-isopropylidenediphenoxy, 1,3,5-trimethyl-2,4,6-tris(3,5-di(tert-butyl)-4-oxybenzyl)benzene, 1,1,2,2-tetrakis(4-oxyphenyl)ethane, 1,1'-bi-2-naphthoxy, 1,3,5-tri(6-oxy-2-naphthyl)benzene, 4'-n-butylamino-4-biphenyloxy, 2,2'-biphenyldi(methylamino), 2,4'-biphenyldi(methylamino), 1,1-binaphthyl-2,2'-di(methylamino), 4,4'-di(isopropylamino)-terphenyl, p,p'-di(ethylamino)quaterphenyl, biphenyl-4,4'-dithio, 2,6-bis(4-phenoxy)pyridine, 3,5-bis(4-benzyloxy)pyridine, 6,6'-dioxy-2,2'-dipyridyl, 6,6''-dioxy-2,2':6',2''-terpyridine, 5-(2-phenoxy)-1,3,4-oxadiazolyl-2-ethyl amino, 5-(2-phenoxy)-1,3,4-oxadiazoyl-2-thio, 5-(4-methylaminophenyl)-1,3,4-oxadiazole-2-thio, 4-(4-oxyphenyl)-thiazolyl-2-oxy, 2,2'-bithiophenyl-5,5'-dioxy, and the like. Preferred polyfunctional groups include 4,4'-ethylenediphenoxy, 4,4'-methylenebis(2,6-di(tert-butyl)phenoxy), and 1,3,5-trimethyl-2,4,6-tris(3,5-di(tert-butyl)-4-benzyloxy)benzene.

The terms oxy, amino, or thio for the polyfunctional groups or polyfunctional moieties described above refers to the examples of J in the formula $E(ArJ-)_g$ when J- is O—, N(R')—, or S— that forms through the reaction of the —OH, —N(R')H, or —SH groups on a polyfunctional compound with an M-R or $M^1$-$Q^1$ moiety of the linking compound to form new O-M, (R')N-M, S-M, O-$M^1$, (R')N-$M^1$, or S-$M^1$ bonds with the losses of the polar monoprotic group's proton as H—R. It should be understood that by reacting the polyfunctional compound with a support material treated with a linking compound, it is expected that at least one of the polar monoprotic groups on the majority of the polyfunctional compounds should react with at least one of the M-R or $M^1$-$Q^1$ group on the linking-treated support to form a linkage of support-linking moiety-polyfunctional compound moiety via sigma bonding. It is not necessary that all of the polar monoprotic groups on the polyfunctional compound react with the M-R or $M^1$-$Q^1$ moieties.

Activator Compositions

Activator compositions of the invention comprise an aluminoxane and an activator precursor composition comprised of i) a support material in contact with a linking compound, and ii) a polyfunctional compound, which has at least two aromatic groups, in which at least two of said aromatic groups each has at least one polar monoprotic group thereon. The support material, linking compound, and polyfunctional compound are as described above for the activator compositions. The aluminoxanes are as described below. It is to be understood that these components may not be in the same form as they were before they became part of the activator composition. Activator compositions of this invention can be produced by the processes described below.

Aluminoxanes

Aluminoxanes are a component of the activator compositions of the invention and are well known in the art. Aluminoxanes are generally obtained by hydrolyzing aluminum compounds such as alkyl aluminum compounds with water e.g., by direct water addition, contact with a water-wet material such as a solvent containing water or a solid substrate such as a porous catalyst support wet with or soaked in water, or via salt hydrate addition; the resulting products, depending on the amount of added water, are dimeric or complex mixtures of oligomeric aluminoxanes. Another way to form aluminoxanes is by reaction of an alkyl aluminum compound with an organic compound with one or more oxygen-containing functional groups such as carbonyl, carboxyl, and/or hydroxyl groups; examples of such compounds include PhCOMe, PhCOOH, PhCOOMe, $Ph_3COH$ and the like. Aluminoxanes that can be used in the practice of this invention also include alkyl-aluminum derived aluminoxanes formed by either of the methods just described and further treated with one or more reagents such as a halogen-containing compound, for example trifluorotoluene-treated aluminoxanes, and dimethylaluminum fluoride-treated aluminoxanes as described in Publications WO 2007/131010 A2, WO 2007/005364 A2, and WO 2005/066191 A1.

Non-limiting examples of aluminoxanes that can be used in this invention include methylaluminoxane, ethylaluminoxane, n-propylaluminoxane, n-butylaluminoxane, isobutylaluminoxane, n-hexylaluminoxane, n-octylaluminoxane, decylaluminoxane, dodecylaluminoxane, tetradecylaluminoxane, hexadecylaluminoxane, octadecylaluminoxane, phenylaluminoxane, tolylaluminoxane, and the like. Mixtures of aluminoxanes may also be used.

Preferred aluminoxanes are those in which the hydrocarbyl groups are saturated, particularly those aluminoxanes in which the hydrocarbyl groups have from one to about twenty carbon atoms. More preferred are aluminoxanes in which the saturated hydrocarbyl groups have from one to about six carbon atoms. Even more preferred are methylaluminoxane, ethylaluminoxane, n-butylaluminoxane, and iso-butylaluminoxane. Highly preferred are methylaluminoxane and ethylaluminoxane. The most highly preferred aluminoxane is methylaluminoxane.

By bringing the linking compound, support material, polyfunctional compound, and aluminoxane into contact, the activator compositions may be comprised of moieties formed from the linking compounds, a support material, and moieties formed from polyfunctional compounds, which may be polyfunctional groups which have at least two aromatic groups in which at least two of said aromatic groups each has at least one polar moiety thereon. Polyfunctional groups and the preferences therefore are as described above.

Catalyst Compositions

The catalyst compositions of this invention are formed from interaction between an activator composition of the invention and at least one catalyst compound or complex of a transition metal, or at least one catalyst compound of a metal of the lanthanide or actinide series. The activator compositions are as described above, and the catalyst compounds and complexes are as just described. It is to be understood that the activator composition and the catalyst compound or complex are not in the same form as they were before they became part of the activator composition. Usually, the catalyst compound or complex contains labile groups that are removed by interaction with the activator composition. Catalyst compositions formed from metallocene-based catalyst compounds are preferred catalyst compositions.

As noted above, the support material also serves as a template to regulate the particle sizes of the activator precursor compositions and/or activator compositions. In turn, the particle sizes of the activator compositions affect the morphology of the catalyst compositions formed with the activator compositions of this invention.

Forming Activator Precursor Compositions

The formation of the activator precursor compositions and the activator compositions is generally facile, and any by-products of the formation present in the activator precursor composition or activator composition does not appear to adversely affect the properties of activator compositions made from the activator precursor compositions, or the catalyst compositions made from the activator compositions.

When preparing an activator precursor composition or an activator composition, the temperature can be ambient, and the reaction mixture can be heated if desired. Typical temperatures for heating the reaction mixture are in the range of about 20° C. to about 130° C., and preferably about 40° C. to about 70° C. Heating the reaction mixture so that it is under reflux conditions is also preferred.

As noted above, this invention relates to processes for forming activator precursor compositions. These processes comprise bringing together, in an inert, anhydrous environment,
i) a support material in contact with a linking compound, and
ii) a polyfunctional compound which has at least two aromatic groups in which at least two of said aromatic groups each has at least one polar monoprotic group thereon.

To form activator precursor compositions of this invention, the support material and the linking compound are contacted to form a linking-treated support, followed by adding the polyfunctional compound thereto.

The order in which the components are brought into contact has some influence on the structure of the activator precursor composition. At least in some instances, the order in which the components are brought together affects the morphology of catalysts ultimately formed from these activator precursor compositions and thereby affects reactor fouling during polymerization with the catalyst.

The activator precursor compositions formed by the above process are activator precursor compositions of this invention.

In the processes for forming activator precursor compositions, the linking compound interacts with both the support material and the polyfunctional compound. Typically this interaction is facilitated via hydrogenolysis reactions of the hydridyl, alkyl or heteroatomic groups attached to metal atom of the linking compound by both the polar monoprotic groups of the support surface and the polar monoprotic groups of the polyfunctional compound. As a result of these hydrogenolysis reactions new chemical bonds are subsequently formed between the metal atom of the linking group and the support and the metal atom of the linking group and the polyfunctional compound while the hydridyl, alkyl, or heteroatomic groups previously attached to the metal atom of the linking compound are eliminated as $H_2$, hydrocarbon (C—H) or heteroatomic moieties, (for example halogen-H, RO—H, $R_2$N—H) respectively.

The ratios of support material, linking compound, and monoprotic polyfunctional compound used in forming the activator precursor compositions can vary. Preferable ratios are determined based upon the number of groups on the linking compound that can undergo hydrogenolyis, the titratable number of monoprotic groups on the support surface, and the number of monoprotic groups contained within the polyfunctional compound such that at least one new chemical bond is formed between the metal atom of the linking compound and the surface group and between the metal atom of the linking compound and the polyfunctional compound as a result of hydrogenolysis reactions. Approximately an equimolar ratio of linking compound and titratable monoprotic groups on the surface of the support material is preferred. A less than equimolar ratio of linking group to polyfunctional compound is also preferred.

Enough linking compound should be included so that a portion of the linking groups of the linking compound (i.e., $R^1$ of organometallic linker $MR^1_sQ_{(t-s)}$ and $Q^1$ of non-organometallic linker $M^1Q^1_t$) can react with at least a portion of the polar monoprotic groups or other polar groups or sites, collectively, polar surface groups, present on the surface of the support material. The ratio of the linking compound ($MR^1_sQ_{(t-s)}$ or $M^1Q^1_t$) to reactive monoprotic groups (i.e., the active protons on the surface of a support that can be reached by and react with the linking compound) on the support is from 0.2:1.0 to (t−1):1.0, wherein t is the valence of the metal of the linking compound, and the ratio of the linking compound to the polyfunctional groups is from 1.0:0.01 to 1.0:2.0; preferably, the ratio of the linking compound to reactive monoprotic groups on the support is from 0.6:1.0 to (t−1):1.0, wherein t is the valence of the metal of the linker compound, and the ratio of the linking compound to the polyfunctional groups is from 1.0:0.1 to 1.0:2.0; and most preferably, the ratio of the linking compound to reactive monoprotic groups on the support is from 0.5:1.0 to 1.0:1.0, and the ratio of the linking compound to the polyfunctional groups is from 1.0:0.3 to 1.0:2.0

It is recommended that the amount of active polar monoprotic groups on the support surface be quantified by a chemical method (e.g., titration with a chemical) in stead of a physical method (e.g., by high temperature calcination to measure LOI, a technique to measure total hydroxy groups for silica supports) because while the former method measures only the portion of monoprotic groups that can react with a chemical, the latter measure the total monoprotic groups including a portion that cannot be reached by a chemical, in this case, the linking compound. Methods for such quantification of the polar monoprotic groups on the support surface include NMR titration with a trialkylaluminum compound or a Grignard reagent as described in Example 4.2-1 of WO 2008/036594. A method similar to WO 2008/036954 but using any particular linking compound described herein as the titration agent is also plausible.

In the processes for forming activator precursor compositions, support material is typically included as about 5 wt % to about 70 wt % relative to the total weight of the linking compound(s) and polyfunctional compound(s) included in the process. Depending on the support pre-treatment conditions and the particular polyfunctional compound, the support material can range from about 5 wt % to about 70 wt % of the activator precursor composition. For support materials calcined at lower temperatures (100 to ~600° C.), the support is usually present in the activator precursor composition at about 5 wt % to about 40 wt % per mole of aromatic rings having a polar monoprotic group thereon of the polyfunctional compound. For support materials calcined at higher temperatures (~600 to 1000° C.), the support is usually present in the activator precursor composition at about 20 wt % to about 70 wt % per mole of aromatic rings having a polar monoprotic group thereon of the polyfunctional compound.

Considering the significantly different molecular weights of different polyfunctional compounds in use, the support can be about 1 to 80% of the total activator precursor weight, more preferably 5 to 60 wt %, and most preferably 10-50 wt %. The typical Al content is 1-30 wt % of the activator precursor total weight, more preferably 3-20 wt %, and most preferably 4-10 wt %. Therefore, the polyfunctional compound can be 1-70 wt %, preferably 4-40 wt %, and more preferably 8-25 wt %.

Regarding the relative amounts of linking compounds, linking groups thereof, polyfunctional groups, the aromatic groups having the polar monoprotic groups thereon, the polar monoprotic groups on the aromatic rings of the polyfunctional compounds, and the support material, the same molar ratios apply to the compositions of the invention e.g., the moles of polar groups of the polyfunctional groups, again keeping in mind that the discussion may more properly refer to the components prior to their interaction to form the compositions (e.g., the linking groups of the linking compound, at least a portion of which are expected to react, and will no longer be part of the linking compound).

Forming Activator Compositions

This invention further relates to processes for forming activator compositions. These processes comprise, in an inert, anhydrous environment, i) forming a linking-treated support by contacting a support material and a linking compound, ii) contacting said linking-treated support with either a) a polyfunctional compound, forming a mixture, and then contacting said mixture with an aluminoxane, or b) an aluminoxane, forming a mixture, and then contacting said mixture with a polyfunctional compound, or c) a portion of a polyfunctional compound, forming a first mixture, contacting said first mixture with the aluminoxane, forming a second mixture, and d) contacting said second mixture with more polyfunctional compound, wherein said polyfunctional compound has at least two aromatic groups in which at least two of said aromatic groups each has at least one polar monoprotic group thereon, such that an activator composition is formed.

In another embodiment, the process for forming an activator composition comprises, in an inert, anhydrous environment, i) forming a linking-treated support by contacting a support material and a linking compound, and ii) contacting said a linking-treated support sequentially with a) a polyfunctional compound followed by an aluminoxane, or b) an aluminoxane followed by a polyfunctional compound, wherein said polyfunctional compound has at least two aromatic groups in which at least two of said aromatic groups each has at least one polar monoprotic group thereon, such that an activator composition is formed.

In some embodiments, the activator composition is made by combining an activator precursor composition with an aluminoxane. When the activator composition is made this way, the morphology of the activator composition is influenced by the particle size of the activator precursor composition. It is not necessary to isolate the activator precursor composition prior to bringing it together with the aluminoxane. When the activator composition is not made from an activator precursor composition, the particle size of the activator composition can be influenced by the particle size of the support material, or by varying the amount of the linking compound. In addition, the amount of aluminoxane affects the activity of a catalyst composition made from an activator composition; the activity of the catalyst composition decreases as the amount of aluminoxane in the activator composition decreases.

To form activator compositions of this invention, the components of the activator compositions can be combined in any of several orders. The aluminoxane can be added as the last component to any of the above sequences described above for forming activator precursor compositions.

In one suitable addition sequence, the support material and linking compound are combined (forming a linking-treated support), followed by combining the polyfunctional compound with the linking-treated support, and then combining the resultant mixture with the aluminoxane. In this sequence, the polyfunctional compound can be added to the linking-treated support, the linking-treated support can be added to the polyfunctional compound, or both can be concurrently fed to a reaction zone.

In another suitable addition sequence, the support material and linking compound are combined (forming a linking-treated support), followed by combining the aluminoxane with the linking-treated support, and then combining the resultant mixture with the polyfunctional compound. In this sequence, the polyfunctional compound can be added to the mixture formed from the linking-treated support and the aluminoxane, or the mixture formed from the linking-treated support and the aluminoxane can be added to the polyfunctional compound.

Without being bound by theory, the two addition sequences just described allow a significant amount of the polyfunctional compound moieties to bind to the support and at the same time bind to the aluminoxane, ensuring that the polyfunctional group-modified aluminoxane can either bind to the support or co-precipitate with the support to regulate the finished catalyst's particle size distribution, the resulting polyolefin resins' morphology, and to minimize or avoid fouling of the polymerization reactor.

Benefits are also from other addition sequences, such as forming a linking-treated support, combining this with a portion of the aluminoxane, then the polyfunctional compound, followed by another portion of aluminoxane; forming a linking-treated support, combining this with a portion of the polyfunctional compound, then the aluminoxane, followed by another portion of polyfunctional compound. The inert solvent can be included at any point during the process, but is preferably present initially.

The activator compositions formed by the above process are activator compositions of this invention.

In the processes for forming activator compositions, the aluminoxane can be brought into contact with the activator precursor and contribute mass about 5-80 wt %, preferably 10-60 wt %, and more preferably 15-50 wt %, to the total weight of the activator composition. Another way of viewing this is that each component of the activator precursor composition is now reduced accordingly due to the introduction of the aluminoxane. The support material is reduced to about 0.2 wt % to about 75 wt % of the total weight of the linking compound(s), polyfunctional compound(s), and aluminoxane(s) included in the process when the activator composition is not formed from an activator precursor composition and an aluminoxane. The polyfunctional compound is reduced to about 0.02 wt % to 65 wt % in the activator composition, preferably 0.8 wt % to 38 wt %, and more preferably 2-24 wt %, depending on the polar monoprotic group number g and the molecular weight of the polyfunctional compound.

In the activator compositions of this invention, the support material is usually about 1 wt % to about 30 wt % of the composition, the activator composition typically contains about 1 wt % to about 60 wt % aluminum, depending on the molecular weight of the polyfunctional compound and the amount of aluminoxane in use.

Processes and Components for Forming Catalyst Compositions

As mentioned above regarding formation and handling of the activator precursor compositions and the activator compositions, it is preferred that the catalyst components as well as the resultant catalyst compositions be handled in an inert, moisture-free, oxygen free environment such as argon, nitrogen or helium because of the sensitivity of the catalyst components and catalyst compositions to moisture and oxygen.

Catalyst compositions are formed by bringing together an activator composition of this invention and a catalyst compound or complex of a transition metal, lanthanide metal, or actinide metal, in an inert solvent. Normally, the activator composition and the catalyst compound or complex are combined in an inert solvent and stirred. Neither heating nor cooling of the reaction is required. Typically, the molar ratio of aluminum in the activator composition to transition metal is in the range of about 10:1 to about $10^5$:1, preferably about 10:1 to about 1000:1, more preferably about 50:1 to about 300:1.

The components used in forming catalyst compositions include an inert solvent, an activator composition of this invention, and a catalyst compound or complex of a transition metal, lanthanide metal, or actinide metal. The inert solvents are as described above for forming the activator precursor compositions and the activator compositions. The activator compositions are as described above. The catalyst compounds and complexes of a transition metal, lanthanide metal, or actinide metal are described as follows.

The activator compositions of this invention are so effective as cocatalysts that they can be used with any known transition metal catalyst compound in which the transition metal thereof is a Group 3 to 10 transition metal of the Periodic Table, as well as with any known catalyst compound of a metal of the lanthanide or actinide series. The Periodic Table referred to herein is that appearing on page 27 of the Feb. 4, 1985 issue of *Chemical & Engineering News*. Groups 3 to 10 of the Periodic Table were formerly known as Groups IIIB through VIIIB. Suitable catalyst compounds can also be described as d- and f-block metal compounds.

See, for example, the Periodic Table appearing on page 225 of Moeller, et al., *Chemistry*, Second Edition, Academic Press, copyright 1984. As regards the metal constituent, preferred are compounds of Fe, Co, Ni, Pd, and V. More preferred are compounds of the metals of Groups 4-6 (Groups IVB to VIB; Ti, Zr, Hf, V, Nb, Ta, Cr, Mo, and W), and most preferred are the Group 4 (Group IVB) metals, especially titanium, zirconium, or hafnium.

Thus the transition metal catalyst compounds used in this invention can be one or more of any Ziegler-Natta catalyst compound, any metallocene, any compound of constrained geometry, any late transition metal complex, or any other transition metal compound or complex reported in the literature or otherwise generally known in the art to be an effective catalyst compound when suitably activated, including mixtures of at least two different types of such transition metal compounds or complexes, such as for example a mixture of a metallocene and a Ziegler-Natta olefin polymerization catalyst compound.

Among the transition metal compounds of the metals of Groups 3, 4, 5, and 6 (Groups MB, IVB, VB, and VIB) which can be used as the transition metal component of the catalyst compositions of and used in this invention are the compounds of such metals as scandium, titanium, zirconium, hafnium, cerium, vanadium, niobium, tantalum, chromium, molybdenum, tungsten, thorium and uranium often referred to as Ziegler-Natta type olefin polymerization catalysts. Preferred compounds of this type can be represented by the formula $MX_n(OR)_m$ in which M represents the transition metal atom or a transition metal atom cation containing one or two oxygen atoms such as vanadyl, zirconyl, or uranyl, X represents a halogen atom, OR represents a hydrocarbyloxy group having up to about 18 carbon atoms, preferably up to about 8 carbon atoms, and more preferably alkyl of up to about 4 carbon atoms, such as an alkyl, cycloalkyl, cycloalkylalkyl, aryl, or aralkyl, group and n and m are positive integers except that either one of them (but not both) can be zero, and where n+m is the valence state of the transition metal. Illustrative of some of the transition metal compounds which can be used are, for example, titanium dibromide, titanium tribromide, titanium tetrabromide, titanium dichloride, titanium trichloride, titanium tetrachloride, titanium trifluoride, titanium tetrafluoride, titanium diiodide, titanium triiodide, titanium tetraiodide, zirconium dibromide, zirconium tribromide, zirconium tetrabromide, zirconium dichloride, zirconium trichloride, zirconium tetrachloride, zirconium tetrafluoride, zirconium tetraiodide, hafnium tetrafluoride, hafnium tetrachloride, hafnium tetrabromide, hafnium tetraiodide, hafnium trichloride, hafnium tribromide, hafnium triiodide, vanadium dichloride, vanadium trichloride, vanadium tetrachloride, vanadium tetrabromide, vanadium tribromide, vanadium dibromide, vanadium trifluoride, vanadium tetrafluoride, vanadium pentafluoride, vanadium diiodide, vanadium triiodide, vanadium tetraiodide, vanadyl chloride, vanadyl bromide, niobium pentabromide, niobium pentachloride, niobium pentafluoride, tantalum pentabromide, tantalum pentachloride, tantalum pentafluoride, chromous bromide, chromic bromide, chromous chloride, chromic chloride, chromous fluoride, chromic fluoride, molybdenum dibromide, molybdenum tribromide, molybdenum tetrabromide, molybdenum dichloride, molybdenum trichloride, molybdenum tetrachloride, molybdenum pentachloride, molybdenum hexafluoride, lanthanum trichloride, cerous fluoride, cerous chloride, cerous bromide, cerous iodide, eerie fluoride, uranium trichloride, uranium tetrachloride, uranium tribromide, uranium tetrabromide, thorium tetrachloride, thorium tetrabromide, and the like. Among the hydrocarbyloxides and mixed halide/hydrocarbyloxides of the transition metals are $Ti(OCH_3)_4$, $Ti(OCH_3)Cl_3$, $Ti(OCH_3)Br_3$, $Ti(OCH_3)_2I_2$, $Ti(OC_2H_5)_4$, $Ti(OC_2H_5)_3Cl$, $Ti(OC_2H_5)Cl_3$, $Ti(OC_2H_5)Br_3$, $Ti(OC_4H_9)Br_3$, $Ti(OC_2H_5)I_3$, $Ti(OC_3H_7)_2Cl_2$, $Ti(O\text{-iso-}C_3H_7)_3Cl$, $Ti(O\text{-iso-}C_3H_7)_2Cl_2$, $Ti(O\text{-iso-}C_3H_7)Cl_3$, $Ti(OC_4H_9)_3Cl$, $Ti(OC_4H_9)_2Cl_2$, $Ti(OC_4H_9)Cl_3$, $Ti(OC_6H_5)Cl_3$, $Ti(O\text{-p-}CH_3C_6H_4)Cl_3$, $Ti(OC_6H_{13})_2Cl_2$, $Ti(OC_6H_{13})Cl_3$, $Ti(O\text{-cyclo-}C_6H_{11})Cl_3$, $Ti(OC_8H_{17})_2Br_2$, $Ti(O\text{-2-EtHex})_4$, $Ti(OC_{12}H_{25})Cl_3$, $Ti(OC_{17}H_{18})_2Br_2$, $Zr(OC_2H_5)_4$, $Zr(OC_4H_9)_4$, $Zr(OC_5H_{11})_4$, $ZrCl(OC_2H_5)_3$, $ZrCl_2(OC_2H_5)_2$, $ZrCl_3(OC_2H_5)$, $ZrCl(OC_4H_9)_3$, $ZrCl_2(OC_4H_9)_2$, $ZrCl_3(OC_4H_9)$, $Hf(OC_4H_9)_4$, $Hf(OC_4H_9)_3Cl$, $VO(OC_2H_5)_3$, $VOCl(OCH_3)_2$, $VOCl(OC_2H_5)_2$, $VOCl(OC_3H_7)_2$, $VOCl(O\text{-iso-}C_3H_7)_2$, $VOCl_2(OCH_3)$, $VOCl_2(OC_2H_5)$, $VOCl_2(OC_3H_7)$, $VOCl_2(O\text{-iso-}C_3H_7)$, $VOBr(OCH_3)_2$, $VOBr(OC_2H_5)_2$, $VOBr(O\text{-iso-}C_4H_9)_2$, $VOBr_2(OC_3H_7)$, $VOBr_2(O\text{-iso-}C_3H_7)$, $VOBr_2(OC_4H_9)$, $VOBr_2(O\text{-iso-}C_4H_9)$, $VOI(OCH_3)_2$, $VOI(OC_2H_5)_2$, $VOI_2(OCH_3)$, $VOI_2(O\text{-cyclo-}C_3H_5)$, $VOI_2(OC_5H_{11})$, $VOI_2(O\text{-cyclo-}C_6H_{11})$, $Cr(O\text{-iso-}C_4H_9)_3$, $Mo(OC_2H_5)_3$, and the like. Carboxylic acid salts and various chelates of the transition metal can also be used but in general are less preferred. A few non-limiting examples of such salts and chelates include zirconyl acetate, uranyl butyrate, chromium acetate, chromium(III) oxy-2-ethylhexanoate, chromium(III) 2-ethylhexanoate, chromium(III) dichloroethylhexanoate, chromium(H) 2-ethylhexanoate, titanium(IV) 2-ethylhexanoate, bis (2,4-pentanedionate)titanium oxide, bis(2,4-pentanedionate) titanium dichloride, bis(2,4-pentanedionate)titanium dibutoxide, vanadyl acetylacetonate, chromium acetylacetonate, niobium acetylacetonate, zirconyl acetylacetonate, chromium octylacetoacetate, and the like. Also, transition metal alkyls such as tetramethyl titanium, methyl titanium trichloride, tetraethyl zirconium, tetraphenyl titanium, and the like can be used.

Preferred transition metal compounds of the well-known Ziegler-Natta catalyst compounds are those of the Group 4 (Group IVB) metals, including the alkoxides, halides, and mixed halide/alkoxide compounds. More preferred are $TiCl_4$, $ZrCl_4$, $HfCl_4$, and $TiCl_3$, with $TiCl_4$ being most preferred. Such more preferred compounds can be used in chelated form in order to facilitate solubility. Suitable chelated catalysts of this type are known and reported in the literature.

Metallocenes are another broad class of olefin polymerization catalyst compounds with which the activator compositions of this invention can be used in forming novel highly effective catalysts of this invention. As used herein, the term "metallocene" includes metal derivatives, which contain at least one cyclopentadienyl moiety. Suitable metallocenes are well known in the art and include the metallocenes of Groups 3, 4, 5, 6 (Groups IIIB, IVB, VB, and VIB), lanthanide and actinide metals, for example, the metallocenes which are described in U.S. Pat. Nos. 2,864, 843; 2,983,740; 4,665,046; 4,874,880; 4,892,851; 4,931, 417; 4,952,713; 5,017,714; 5,026,798; 5,036,034; 5,064, 802; 5,081,231; 5,145,819; 5,162,278; 5,245,019; 5,268, 495; 5,276,208; 5,304,523; 5,324,800; 5,329,031; 5,329, 033; 5,330,948, 5,347,025; 5,347,026; and 5,347,752, whose teachings with respect to such metallocenes are incorporated herein by reference.

Metallocene structures in this specification are to be interpreted broadly, and include structures containing 1, 2, 3 or 4 Cp or substituted Cp rings. Thus metallocenes suitable for use in this invention can be represented by Formula (I):

$$B_a Cp_b M X_c Y_d \qquad (I)$$

where Cp, independently in each occurrence, is a cyclopentadienyl-moiety-containing group which typically has in the range of 5 to about 24 carbon atoms; B is a bridging group or ansa group that links two Cp groups together or alternatively carries an alternate coordinating group such as alkylaminosilylalkyl, silylamido, alkoxy, siloxy, aminosilylalkyl, or analogous monodentate hetero atom electron donating groups; M is a d- or f-block metal atom; each X and each Y is, independently, a group that is bonded to the d- or f-block metal atom; a is 0 or 1; b is a whole integer from 1 to 3 (preferably 2); c is at least 2; d is 0 or 1. The sum of b, c, and d is sufficient to form a stable compound, and often is the coordination number of the d- or f-block metal atom.

Cp is, independently, a cyclopentadienyl, indenyl, fluorenyl or related group that can π-bond to the metal, or a hydrocarbyl-, halo-, halohydrocarbyl-, hydrocarbylmetalloid-, and/or halohydrocarbylmetalloid-substituted derivative thereof. Cp typically contains up to 75 non-hydrogen atoms. B, if present, is typically a silylene (—SiR$_2$—), benzo (C$_6$H$_4$<), substituted benzo, methylene (—CH$_2$—), substituted methylene, ethylene (—CH$_2$CH$_2$—), or substituted ethylene bridge. M is preferably a metal atom of Groups 4-6, and most preferably is a Group 4 (Group IVB) metal atom, especially hafnium, and most especially zirconium. X can be a divalent substituent such as an alkylidene group, a cyclometallated hydrocarbyl group, or any other divalent chelating ligand, two loci of which are singly bonded to M to form a cyclic moiety which includes M as a member. Each X, and if present Y, can be, independently in each occurrence, a halogen atom, a hydrocarbyl group (alkyl, cycloalkyl, alkenyl, cycloalkenyl, aryl, aralkyl, etc.), hydrocarbyloxy, (alkoxy, aryloxy, etc.) siloxy, amino or substituted amino, hydride, acyloxy, triflate, and similar univalent groups that form stable metallocenes. The sum of b, c, and d is a whole number, and is often from 3-5. When M is a Group 4 (Group IVB) metal or an actinide metal, and b is 2, the sum of c and d is 2, c being at least 1. When M is a Group 3 (Group IIIB) or lanthanide metal, and b is 2, c is 1 and d is zero. When M is a Group 5 (Group VB) metal, and b is 2, the sum of c and d is 3, c being at least 2.

Also useful in this invention are compounds analogous to those of Formula (I) where one or more of the Cp groups are replaced by cyclic unsaturated charged groups isoelectronic with Cp, such as borabenzene or substituted borabenzene, azaborole or substituted azaborole, and various other isoelectronic Cp analogs. See for example Krishnamurti, et al., U.S. Pat. Nos. 5,554,775 and 5,756,611.

In one preferred group of metallocenes, b is 2, i.e., there are two cyclopentadienyl-moiety containing groups in the molecule, and these two groups can be the same or they can be different from each other.

Another sub-group of useful metallocenes which can be used in the practice of this invention are metallocenes of the type described in WO 98/32776 published Jul. 30, 1998. These metallocenes are characterized in that one or more cyclopentadienyl groups in the metallocene are substituted by one or more polyatomic groups attached via a N, O, S, or P atom or by a carbon-to-carbon double bond. Examples of such substituents on the cyclopentadienyl ring include —OR, —SR, —NR$_2$, —CH═, —CR═, and —PR$_2$, where R can be the same or different and is a substituted or unsubstituted C$_1$-C$_{16}$ hydrocarbyl group, a tri-C$_1$-C$_8$ hydrocarbylsilyl group, a tri-C$_1$-C$_8$ hydrocarbyloxysilyl group, a mixed C$_1$-C$_8$ hydrocarbyl and C$_1$-C$_8$ hydrocarbyloxysilyl group, a tri-C$_1$-C$_8$ hydrocarbylgermyl group, a tri-C$_1$-C$_8$ hydrocarbyloxygermyl group, or a mixed C$_1$-C$_8$ hydrocarbyl and C$_1$-C$_8$ hydrocarbyloxygermyl group.

Examples of metallocenes to which this invention is applicable include such compounds as:
bis(cyclopentadienyl)zirconium dimethyl;
bis(cyclopentadienyl)zirconium dichloride;
bis(cyclopentadienyl)zirconium monomethylmonochloride;
bis(cyclopentadienyl)titanium dichloride;
bis(cyclopentadienyl)titanium difluoride;
cyclopentadienylzirconium tri-(2-ethylhexanoate);
bis(cyclopentadienyl)zirconium hydrogen chloride;
bis(cyclopentadienyl)hafnium dichloride;
racemic and meso dimethylsilanylene-bis(methylcyclopentadienyl)hafnium dichloride;
racemic dimethylsilanylene-bis(indenyl)hafnium dichloride;
racemic ethylene-bis(indenyl)zirconium dichloride;
($\eta^5$-indenyl)hafnium trichloride;
($\eta^5$-C$_5$Me$_5$)hafnium trichloride;
racemic dimethylsilanylene-bis(indenyl)thorium dichloride;
racemic dimethylsilanylene-bis(4,7-dimethyl-1-indenyl)zirconium dichloride;
racemic dimethyl-silanylene-bis(indenyl)uranium dichloride;
racemic dimethylsilanylene-bis(2,3,5-trimethyl-1-cyclopentadienyl)zirconium dichloride;
racemic dimethyl-silanylene(3-methylcyclopentadienyl) hafnium dichloride;
racemic dimethylsilanylene-bis(1-(2-methyl-4-ethyl)indenyl) zirconium dichloride;
racemic dimethylsilanylene-bis(2-methyl-4,5,5,7-tetrahydro-1-indenyl) zirconium dichloride;
bis(pentamethylcyclopentadienyl)thorium dichloride;
bis(pentamethylcyclopentadienyl)uranium dichloride;
(tert-butylamido)dimethyl(tetramethyl-$\eta^5$-cyclopentadienyl)silanetitanium dichloride;
(tert-butylamido)dimethyl(tetramethyl-$\eta^5$-cyclopentadienyl)silane chromium dichloride;
(tert-butylamido)dimethyl(-$\eta^5$-cyclopentadienyl)silanetitanium dichloride;
(tert-butylamido)dimethyl(tetramethyl-$\eta^5$-cyclopentadienyl)silanemethyltitanium bromide;
(tert-butylamido)(tetramethyl-$\eta^5$-cyclopentadienyl)-1,2-ethanediyluranium dichloride;
(tert-butylamido)(tetramethyl-$\eta^5$-cyclopentadienyl)-1,2-ethanediyltitanium dichloride;
(methylamido)(tetramethyl-$\eta^5$-cyclopentadienyl)-1,2-ethanediylcerium dichloride;
(methylamido)(tetramethyl-$\eta^5$-cyclopentadienyl)-1,2-ethanediyltitanium dichloride;
(ethylamido)(tetramethyl-$\eta^5$-cyclopentadienyl)methylenetitanium dichloride;
(tert-butylamido)dibenzyl(tetramethyl-$\eta^5$-cyclopentadienyl)-silanebenzylvanadium chloride;
(benzylamido)dimethyl(indenyl)silanetitanium dichloride;
(phenylphosphido)dimethyl(tetramethyl-$\eta^5$-cyclopentadienyl)silanebenzyltitanium chloride;
rac-dimethylsilylbis(2-methyl-1-indenyl)zirconium dimethyl;
rac-ethylenebis(1-indenyl)zirconium dimethyl;
bis(methylcyclopentadienyl)titanium dimethyl;
bis(methylcyclopentadienyl)zirconium dimethyl;
bis(n-butylcyclopentadienyl)zirconium dimethyl;
bis(dimethylcyclopentadienyl)zirconium dimethyl;
bis(diethylcyclopentadienyl)zirconium dimethyl;
bis(methyl-n-butylcyclopentadienyl)zirconium dimethyl;
bis(n-propylcyclopentadienyl)zirconium dimethyl;
bis(2-propylcyclopentadienyl)zirconium dimethyl;
bis(methylethylcyclopentadienyl)zirconium dimethyl;
bis(indenyl)zirconium dimethyl;
bis(methylindenyl)zirconium dimethyl;
dimethylsilylenebis(indenyl)zirconium dimethyl;
dimethylsilylenebis(2-methylindenyl)zirconium dimethyl;
dimethylsilylenebis(2-ethylindenyl)zirconium dimethyl;

dimethylsilylenebis(2-methyl-4-phenylindenyl)zirconium dimethyl;
1,2-ethylenebis(indenyl)zirconium dimethyl;
1,2-ethylenebis(methylindenyl)zirconium dimethyl;
2,2-propylidenebis(cyclopentadienyl)(fluorenyl)zirconium dimethyl;
dimethylsilylenebis(6-phenylindenyl)zirconium dimethyl;
bis(methylindenyl)zirconium benzyl methyl;
ethylenebis[2-(tert-butyldimethylsiloxy)-1-indenyl]zirconium dimethyl;
dimethylsilylenebis(indenyl)chlorozirconium methyl;
5-(cyclopentadienyl)-5-(9-fluorenyl)1-hexene zirconium dimethyl;
dimethylsilylenebis(2-methylindenyl)hafnium dimethyl;
dimethylsilylenebis(2-ethylindenyl)hafnium dimethyl;
dimethylsilylenebis(2-methyl-4-phenylindenyl)hafnium dimethyl;
2,2-propylidenebis(cyclopentadienyl)(fluorenyl)hafnium dimethyl;
bis(9-fluorenyl)(methyl)(vinyl)silane zirconium dimethyl,
bis(9-fluorenyl)(methyl)(prop-2-enyl)silane zirconium dimethyl,
bis(9-fluorenyl)(methyl)(but-3-enyl)silane zirconium dimethyl,
bis(9-fluorenyl)(methyl)(hex-5-enyl)silane zirconium dimethyl,
bis(9-fluorenyl)(methyl)(oct-7-enyl)silane zirconium dimethyl,
(cyclopentadienyl)(1-allylindenyl) zirconium dimethyl,
bis(1-allylindenyl)zirconium dimethyl,
(9-(prop-2-enyl)fluorenyl)(cyclopentadienyl)zirconium dimethyl,
(9-(prop-2-enyl)fluorenyl)(pentamethylcyclopentadienyl) zirconium dimethyl,
bis(9-(prop-2-enyl)fluorenyl) zirconium dimethyl,
(9-(cyclopent-2-enyl)fluorenyl)(cyclopentadienyl) zirconium dimethyl,
bis(9-(cyclopent-2-enyl)(fluorenyl)zirconium dimethyl,
5-(2-methylcyclopentadienyl)-5(9-fluorenyl)-1-hexene zirconium dimethyl,
1-(9-fluorenyl)-1-(cyclopentadienyl)-1-(but-3-enyl)-1-(methyl)methane zirconium dimethyl,
5-(fluorenyl)-5-(cyclopentadienyl)-1-hexene hafnium dimethyl,
(9-fluorenyl)(1-allylindenyl)dimethylsilane zirconium dimethyl,
1-(2,7-di(alpha-methylvinyl)(9-fluorenyl)-1-(cyclopentadienyl)-1,1-dimethylmethane zirconium dimethyl,
1-(2,7-di(cyclohex-1-enyl)(9-fluorenyl))-1-(cyclopentadienyl)-1,1-methane zirconium dimethyl,
5-(cyclopentadienyl)-5-(9-fluorenyl)-1-hexene titanium dimethyl,
5-(cyclopentadienyl)-5-(9-fluorenyl)1-hexene titanium dimethyl,
bis(9-fluorenyl)(methyl)(vinyl)silane titanium dimethyl,
bis(9-fluorenyl)(methyl)(prop-2-enyl)silane titanium dimethyl,
bis(9-fluorenyl)(methyl)(but-3-enyl)silane titanium dimethyl,
bis(9-fluorenyl)(methyl)(hex-5-enyl)silane titanium dimethyl,
bis(9-fluorenyl)(methyl)(oct-7-enyl)silane titanium dimethyl,
(cyclopentadienyl)(1-allylindenyl) titanium dimethyl,
bis(1-allylindenyl)titanium dimethyl,
(9-(prop-2-enyl)fluorenyl)(cyclopentadienyl)hafnium dimethyl,
(9-(prop-2-enyl)fluorenyl)(pentamethylcyclopentadienyl) hafnium dimethyl,
bis(9-(prop-2-enyl)fluorenyl) hafnium dimethyl,
(9-(cyclopent-2-enyl)fluorenyl)(cyclopentadienyl) hafnium dimethyl,
bis(9-(cyclopent-2-enyl)(fluorenyl)hafnium dimethyl,
5-(2-methylcyclopentadienyl)-5(9-fluorenyl)-1-hexene hafnium dimethyl,
5-(fluorenyl)-5-(cyclopentadienyl)-1-octene hafnium dimethyl,
(9-fluorenyl)(1-allylindenyl)dimethylsilane hafnium dimethyl.
(tert-butylamido)dimethyl(tetramethylcyclopentadienyl)silane titanium(1,3-pentadiene);
(cyclopentadienyl)(9-fluorenyl)diphenylmethane zirconium dimethyl;
(cyclopentadienyl)(9-fluorenyl)diphenylmethane hafnium dimethyl;
dimethylsilanylene-bis(indenyl) thorium dimethyl;
dimethylsilanylene-bis(4,7-dimethyl-1-indenyl) zirconium dimethyl;
dimethylsilanylene-bis(indenyl) uranium dimethyl;
dimethylsilanylene-bis(2-methyl-4-ethyl-1-indenyl) zirconium dimethyl;
dimethylsilanylene-bis(2-methyl-4,5,6,7-tetrahydro-1-indenyl) zirconium dimethyl;
(tert-butylamido)dimethyl(tetramethyl-$\eta^5$-cyclopentadienyl)silane titanium dimethyl;
(tert-butylamido)dimethyl(tetramethyl-$\eta^5$-cyclopentadienyl)silane chromium dimethyl;
(tert-butylamido)dimethyl(tetramethyl-$\eta^5$-cyclopentadienyl)silane titanium dimethyl;
(phenylphosphido)dimethyl(tetramethyl-$\eta^5$-cyclopentadienyl)silane titanium dimethyl; and
[dimethylsilanediylbis(indenyl)]scandium methyl.

In many cases the metallocenes such as referred to above will exist as racemic mixtures, but pure enantiomeric forms or mixtures enriched in a given enantiomeric form can be used.

Other organometallic catalytic compounds with which the activator compositions of this invention can be used in forming novel catalysts of this invention are the late transition metal catalyst described, for example, in U.S. Pat. No. 5,516,739 to Barborak, et al.; U.S. Pat. No. 5,561,216 to Barborak, et al.; U.S. Pat. No. 5,866,663 to Brookhart, et al; U.S. Pat. No. 5,880,241 to Brookhart, et al; and U.S. Pat. No. 6,114,483 to Coughlin, et al. Such catalysts are sometimes referred to herein collectively as "a Brookhart-type late transition metal catalyst compound or complex."

Other transition metal catalyst compounds and catalyst complexes that can be used in the practice of this invention include catfluoro nickel, palladium, iron, and cobalt complexes containing diimine and bisoxazoline ligands such as described in Johnson et al. WO 96/23010; palladium and nickel catalysts containing selected bidentate phosphorus-containing ligands such as described in EP 381,495; catfluoro α-diimine-based nickel and palladium complexes such as described by Johnson et al. in *J. Am. Chem. Soc.*, 1995, 117, 6414, see also Brown et al. WO 97/17380; nickel complexes such as described by Johnson et al. in U.S. Pat. No. 5,714,556; cobalt(III) cyclopentadienyl catalytic systems such as described by Schmidt et al. in *J. Am. Chem. Soc.*, 1985, 107, 1443, and by Brookhart et al. in *Macromolecules*, 1995, 28, 5378; anfluoro phosphorus, oxygen donors ligated to nickel(II) such as described by Klabunde in U.S. Pat. Nos. 4,716,205, 4,906,754, 5,030,606, and 5,175,326; Group 8-10 (Group VIIIB) transition metal complexes coordinated with a bidentate ligand such as described in WO 98/40374; transition metal complexes with bidentate ligands containing pyridine or quinoline moieties such as described in U.S. Pat. No. 5,637,660; quinolinoxy or pyridinoxy-substituted Group 4 (Group IVB) transition metal trihalides such as described in U.S. Pat. No. 6,020,493; nickel complexes such as described by bis(ylide)nickel complexes such as described by Starzewski et al. in *Angew. Chem. Int. Ed. Engl.,* 1987, 26, 63, and U.S. Pat. No. 4,691,036; neutral N, O, P, or S donor ligands in combination with a nickel(0) compound and an acid such as described in WO 97/02298; aminobis(imino)phosphorane nickel catalysts such as described by Fink et al. in U.S. Pat. No. 4,724,273.

Illustrative, non-limiting additional examples of various types of transition metal compounds that can be employed include the following:

2,6-bis-[1-(1-methylphenylimino)ethyl]pyridine iron[II] chloride;
2,6-bis[1-(1-ethylphenylimino)ethyl]pyridine iron[II] chloride;
2,6-bis[1-(1-isopropylphenylimino)ethyl]pyridine iron[II] chloride;
2,6-bis-(1-(2-methylphenylimino)ethyl)pyridine iron(II) chloride;
N,N'-di(trimethylsilyl)benzamidinato copper(II);
tridentate Schiff base complexes of cobalt and iron described by Mashima in *Shokubai* 1999, vol. 41, p. 58;
nickel compounds of the type described in U.S. Pat. No. 5,880,323;
nickel(II) acetylacetonate;
bis(acetonitrile)dichloro palladium(II);
bis(acetonitrile)bis(tetrafluoroborate)palladium(II);
(2,2'-bipyridine)dichloro palladium(II);
bis(cyclooctadienyl) nickel(0);
palladium(II) acetylacetonate;
bis(salicylaldiminato) complexes of the type described by Matsui et. al. in *Chemistry Letters* 2000, pp. 554-555;
cobalt dioctoate;
cobaltocene;
(cyclopentadienyl)(triphenylphosphino)cobalt(II) diiodide; and
nickel compounds of the type described in JP 09-272709.

Preferred transition metal compounds, which can be used in forming the catalyst compositions of this invention, are transition metal compounds, which can be represented by the formula:

$$MX_nY_m$$

where M is a transition metal of Group 4 to 8 (Group IVB to VIIIB) including the lanthanide series and actinide series, and preferably of Group 4 to 6 (Group IVB to VIB), of the Periodic Table, and Y is, independently, a halide or pseudohalide, n is the valence of M, and m is an integer of from 0 to n−1. Of the pseudohalides, preferred are alkoxide or oxyhalide groups. Pseudohalides, which is a term of art, refers to anfluoro moieties which as salt-like anions which are non-halogenides. Non-limiting examples of suitable pseudohalide groups are oxyhalide groups, hydrocarbyloxy groups (—OR groups such as alkoxy, aryloxy, cycloalkoxy, arylalkoxy, etc.), amido groups (—NR₂), hydrocarbylthio groups (—SR groups), and the like. Most preferred are compounds of the above formula wherein M is a Group 4 (Group IVB) metal. Non-limiting examples of suitable transition metal compounds include, for example, transition metal halides and oxyhalides such as titanium dibromide, titanium tribromide, titanium tetrabromide, titanium dichloride, titanium trichloride, titanium tetrachloride, titanium trifluoride, titanium tetrafluoride, titanium diiodide, titanium tetraiodide, zirconium dibromide, zirconium tribromide, zirconium tetrabromide, zirconium dichloride, zirconium trichloride, zirconium tetrachloride, zirconium tetrafluoride, zirconium tetraiodide, hafnium tetrafluoride, hafnium tetrachloride, hafnium tetrabromide, hafnium tetraiodide, hafnium trichloride, hafnium tribromide, hafnium triiodide, hafnium oxychloride, vanadium dichloride, vanadium trichloride, vanadium tetrachloride, vanadium trifluoride, vanadium tetrafluoride, vanadium pentafluoride, vanadium triiodide, vanadium oxytrichloride, vanadium oxytribromide, niobium pentabromide, niobium pentachloride, niobium pentafluoride, tantalum pentabromide, tantalum pentachloride, tantalum pentafluoride, chromous bromide, chromic bromide, chromous chloride, chromic chloride, chromous fluoride, chromic fluoride, molybdenum dibromide, molybdenum tribromide, molybdenum tetrabromide, molybdenum dichloride, molybdenum trichloride, molybdenum tetrachloride, molybdenum pentachloride, molybdenum hexafluoride, lanthanum trichloride, cerous fluoride, cerous chloride, cerous bromide, cerous iodide, eerie fluoride, uranium trichloride, uranium tetrachloride, uranium tribromide, uranium tetrabromide, thorium tetrachloride, thorium tetrabromide, and the like. Among suitable alkoxides and mixed halide/alkoxides of the transition metals are Ti(OCH₃)₄, Ti(OC₂H₅)₄, Ti(OC₂H₅)₃Cl, Ti(OC₂H₅)Cl₃, Ti(O-iso-C₃H₇)Cl₃, Ti(OC₄H₉)₃Cl, Ti(OC₃H₇)₂Cl₂, Ti(O-iso-C₃H₇)₂Cl₂, Ti(OC₁₇H₁₈)₂Br₂, Zr(OC₂H₅)₄, Zr(OC₄H₉)₄, Zr(OC₅H₁₁)₄, ZrCl₃(OC₂H₅), ZrCl(OC₄H₉)₃, Hf(OC₄H₉)₄, Hf(OC₄H₉)₃Cl, VO(OC₂H₅)₃, Cr(O-iso-C₄H₉)₃, Mo(OC₂H₅)₃, and the like. Other transition metal compounds which may be used include amides such as Ti(NMe₂)₄, Zr(NMe₂)₄, Ti(NEt₂)₄, Zr(NEt₂)₄, and Ti(NBu₂)₄; carboxylic acid salts such as titanium oxalate, cobalt acetate, chromium acetate, nickel formate, thallium oxalate, and uranyl formate. Among the more preferred transition metal compounds are the halides, oxyhalides, alkoxides, and mixed halide-alkoxides of the Group 4 to 6 (Group IVB to VIB) metals, and more particularly of the metals of Groups 4 and 5 (Group IVB and VB). Among especially preferred transition metal compounds are the trivalent or tetravalent Group 4 (Group IVB) metal halides, particularly the chlorides, and the vanadium oxyhalides, particularly vanadium oxytrichloride.

Polymerization and Polymers of this Invention

The catalyst compositions of this invention are useful in producing olefin polymers and especially ethylene polymers, propylene polymers, ethylene/α-olefin copolymers, styrene polymers and copolymers and the like. In conducting the polymerizations pursuant to this invention, the catalyst components can be in solution or in solid form. When the catalyst composition is in a solution, the solvent can be, where applicable, a large excess quantity of the liquid olefinic monomer. Typically, however, an ancillary inert solvent, typically a liquid paraffinic or aromatic hydrocarbon solvent is used, such as heptane, isooctane, decane, toluene, xylene, ethylbenzene, mesitylene, or mixtures of liquid paraffinic hydrocarbons and/or liquid aromatic hydrocarbons.

Polymers can be produced pursuant to this invention by homopolymerization of olefins, typically 1-olefins (also known as α-olefins) such as ethylene, propylene, 1-butene, styrene, or copolymerization of two or more copolymerizable monomers, at least one of which is typically a 1-olefin. The other monomer(s) used in forming such copolymers can be one or more different 1-olefins and/or a diolefin, and/or

an acetylenic monomer. Olefins that can be polymerized in the presence of the catalyst compositions of this invention include α-olefins having 2 to 20 carbon atoms such as ethylene, propylene, 1-butene, 1-hexene, 4-methyl-1-pentene, 1-octene, 1-decene, 1-dodecene, 1-tetradecene, 1-hexadecene, and 1-octadecene. Normally, the hydrocarbon monomers used, such as 1-olefins, diolefins and/or acetylene monomers, will contain up to about 10 carbon atoms per molecule. Preferred 1-olefin monomers for use in the process include ethylene, propylene, 1-butene, 3-methyl-1-butene, 4-methyl-1-pentene, 1-hexene, and 1-octene. It is particularly preferred to use the catalyst compositions of this invention in the polymerization of ethylene, or propylene, or ethylene and at least one $C_3$-$C_8$ 1-olefin copolymerizable with ethylene. Typical diolefin monomers which can be used to form terpolymers with ethylene and propylene include butadiene, hexadiene, norbornadiene, and similar copolymerizable diene hydrocarbons. 1-Heptyne and 1-octyne are illustrative of suitable acetylenic monomers which can be used.

Often the monomer used is a 1-alkene monomer whereby a homopolymer is prepared. In other frequent cases a mixture of a 1-alkene monomer such as ethylene and at least one monomer copolymerizable therewith is used whereby a copolymer is produced.

Polymerization of ethylene or copolymerization with ethylene and an α-olefin having 3 to 10 carbon atoms may be performed in either the gas or liquid phase (e.g., in a solvent, such as toluene, or heptane). The polymerization can be conducted at conventional temperatures (e.g., 0° to 120° C.) and pressures (e.g., ambient to 50 kg/cm²) using conventional procedures as to molecular weight regulations and the like.

The heterogeneous catalysts of this invention can be used in polymerizations conducted as slurry processes or as gas phase processes. By "slurry" in this connection is meant that the particulate catalyst is used as a slurry or dispersion in a suitable liquid reaction medium which may be composed of one or more ancillary solvents (e.g., liquid aliphatic or aromatic hydrocarbons, etc.) or an excess amount of liquid monomer to be polymerized in bulk. Generally speaking, these polymerizations are conducted at one or more temperatures in the range of about 0 to about 160° C. and under atmospheric, subatmospheric, or superatmospheric conditions. Preferably polymerizations conducted in a liquid reaction medium containing a slurry or dispersion of a catalyst of this invention are conducted at temperatures in the range of about 40 to about 110° C. Typical liquid diluents for such processes include isobutane, pentane, isopentane, hexane, heptane, toluene, and like materials. Typically, when conducting gas phase polymerizations, superatmospheric pressures are used, and the reactions are conducted at temperatures in the range of about 50 to about 160° C. These gas phase polymerizations can be performed in a stirred or fluidized bed of catalyst in a pressure vessel adapted to permit the separation of product particles from unreacted gases. Thermostated ethylene, comonomer, hydrogen and an inert diluent gas such as nitrogen can be introduced or recirculated to maintain the particles at the desired polymerization reaction temperature. An aluminum alkyl such as triethylaluminum may be added as a scavenger of water, oxygen and other impurities. In such cases the aluminum alkyl is preferably employed as a solution in a suitable dry liquid hydrocarbon solvent such as toluene or xylene. Concentrations of such solutions in the range of about $5 \times 10^{-5}$ molar are conveniently used. But solutions of greater or lesser concentrations can be used, if desired. Polymer product can be withdrawn continuously or semi-continuously at a rate that maintains a constant product inventory in the reactor.

In general, the polymerizations and copolymerizations conducted pursuant to this invention are carried out using a catalytically effective amount of a novel catalyst composition of this invention, which amount may be varied depending upon such factors such as the type of polymerization being conducted, the polymerization conditions being used, and the type of reaction equipment in which the polymerization is being conducted. In many cases, the amount of the catalyst of this invention used will be such as to provide in the range of about 0.000001 to about 0.01 percent by weight of transition, lanthanide, or actinide metal based on the weight of the monomer(s) being polymerized.

The morphology of the catalyst compositions formed with the activator compositions of this invention affects the morphology of the polymers produced with these catalysts. It has been found that a catalyst with a narrower particle size range results in noticeably less reactor fouling, which in turn minimizes reactor shutdowns for cleaning and maintenance. In the Examples below, the resin morphologies are indicated by the degree of fouling of the polymerization reactor.

After polymerization and deactivation of the catalyst in a conventional manner, the product polymer can be recovered from the polymerization reactor by any suitable means. When conducting the process with a slurry or dispersion of the catalyst in a liquid medium the product typically is recovered by a physical separation technique (e.g., decantation, etc.). The recovered polymer is usually washed with one or more suitably volatile solvents to remove residual polymerization solvent or other impurities, and then dried, typically under reduced pressure with or without addition of heat. When conducting the process as a gas phase polymerization, the product after removal from the gas phase reactor is typically freed of residual monomer by means of a nitrogen purge, and may possibly be used without further catalyst deactivation or catalyst removal.

When preparing polymers pursuant to this invention, conditions may be used for preparing unimodal or multimodal polymer types. For example, mixtures of catalysts of this invention formed from two or more different metallocenes having different propagation and termination rate constants for ethylene polymerizations can be used in preparing polymers having broad molecular weight distributions of the multimodal type. As alluded to above, the catalyst morphology affects the morphology of the polymers produced, as evidenced by the degree of reactor fouling.

Polymers produced by this invention are formed into articles of manufacture.

The foregoing operations described herein are conducted under conventional inert atmospheres using suitably anhydrous materials.

The following Examples illustrate the present invention. It is to be understood, however, that the invention, as fully described herein and as recited in the claims, is not intended to be limited by the details of the following Examples.

Example 1

Diethylzinc (DEZ) Linker

Activator Preparation

In a drybox with a $N_2$ atmosphere, silica gel (5 g, calcined at 140° C. for 2 hours, P-10, Fuji Silysia Chemical Ltd.) was slurried in toluene (37 g). Under agitation 12 wt % of diethylzinc in toluene (DEZ, 10.71 g, product of Albemarle Corporation) was slowly added. The mixture was stirred at ambient temperature for 30 minutes, To this mixture was added 1,3,5-trimethyl-2,4,6-tris(3,5-di-tert-butyl-4-hydroxybenzyl)benzene (ETHANOX 330, 12.256 g, 20 wt % solution in toluene, product of Albemarle Corporation). This mixture was allowed to stir at ambient temperature for 1 hour, after which methylaluminoxane (MAO, 13.197 g, 30 wt % solution in toluene, product of Albemarle Corporation) was added to the mixture while stirring. When the addition of MAO was complete, the mixture was allowed to react at room temperature for 30 minutes. Then the mixture slurry was heated at 120° C. for 4 hours. After cooling the mixture to ambient temperature, the mixture activator slurry can be in-situ reacted with metal complex catalyst precursor to prepare final supported catalyst. Or the activator can be isolated by filtration, washing with toluene and isohexane, and drying under vacuum.

Catalyst Preparation

The above isolated activator (8.15 g) was re-slurried in toluene (61 g). To the activator slurry was added 25 wt % toluene solution of bis(1-methyl-3-butylcyclopentadienyl)zirconium dichloride (603 mg, Albemarle Corporation product). After addition the mixture was stirred at ambient temperature for 2 hours. The pale white solid was then filtered. The solid on the filter was washed twice with toluene (10 g) and with isohexane (10 g) three times, and then dried under vacuum for 1 hour at ambient temperature. A pale white solid powder (8.32 g) was obtained. Elemental analysis of the dry powder by ICP: Al 15.60 wt %; Zr 0.40 wt %, Zn 0.44 wt %. Ethylene/1-hexene copolymerization results of the catalyst are provided in Table 1.

Example 2

Butylethylmagnesium (BEM) Linker

Activator Preparation

In a drybox with a $N_2$ atmosphere, silica gel (5 g, calcined at 140° C. for 2 hours, P-10, Fuji Silysia Chemical Ltd.) was slurried in toluene (37 g). Under agitation 21.5 wt % of butylethylmagnesium in isohexane (BEM, 5.24 g, product of Albemarle Corporation) was slowly added. The mixture was stirred at ambient temperature for 30 minutes. To this mixture was added 1,3,5-trimethyl-2,4,6-tris(3,5-di-tert-butyl-4-hydroxybenzyl)benzene (ETHANOX 330, 12.256 g, 20 wt % solution in toluene, product of Albemarle Corporation). This mixture was allowed to stir at ambient temperature for 1 hour, after which methylaluminoxane (MAO, 13.197 g, 30 wt % solution in toluene, product of Albemarle Corporation) was added to the mixture while stirring. When the addition of MAO was complete, the mixture was allowed to react at room temperature for 30 minutes. Then the mixture slurry was heated at 120° C. for 4 hours. After cooling the mixture to ambient temperature, the mixture activator slurry can be in-situ reacted with metal complex catalyst precursor to prepare final supported catalyst. Or the activator can be isolated by filtration, washing with toluene and isohexane, and drying under vacuum.

Catalyst Preparation

The above isolated activator (7.53 g) was re-slurried in toluene (55 g). To the activator slurry was added 25 wt % toluene solution of bis(1-methyl-3-butylcyclopentadienyl)zirconium dichloride (557 mg, Albemarle Corporation product). After addition the mixture was stirred at ambient temperature for 2 hours. The yellow solid was then filtered. The solid on the filter was washed twice with toluene (10 g) and with isohexane (10 g) three times, and then dried under vacuum for 1 hour at ambient temperature. A yellow solid powder (7.64 g) was obtained. Elemental analysis of the dry powder by ICP: Al 14.14 wt %; Zr 0.39 wt %; Mg 2.29 wt %. Ethylene/1-hexene copolymerization results of the catalyst are provided in Table 1.

Example 3

Butylethylmagnesium (BEM) and Timethylaluminum (TMA) Linker

Activator Preparation

In a drybox with a $N_2$ atmosphere, silica gel (5 g, calcined at 140° C. for 2 hours, P-10, Fuji Silysia Chemical Ltd.) was slurried in toluene (37 g). Under agitation 12 wt % of trimethylaluminum in toluene (TMA, 3.06 g, product of Albemarle Corporation) was added. The mixture was stirred at ambient temperature for 30 minutes. Then the mixture slurry was slowly added 21.5 wt % of butylethylmagnesium in isohexane (BEM, 2.62 g, product of Albemarle Corporation) was slowly added. The mixture was stirred at ambient temperature for another 30 minutes. To this mixture was added 1,3,5-trimethyl-2,4,6-tris(3,5-di-tert-butyl-4-hydroxybenzyl)benzene (ETHANOX 330, 12.256 g, 20 wt % solution in toluene, product of Albemarle Corporation). This mixture was allowed to stir at ambient temperature for 1 hour, after which methylaluminoxane (MAO, 13.197 g, 30 wt % solution in toluene, product of Albemarle Corporation) was added to the mixture while stirring. When the addition of MAO was complete, the mixture was allowed to react at room temperature for 30 minutes. Then the mixture slurry was heated at 120° C. for 4 hours. After cooling the mixture to ambient temperature, the mixture activator slurry can be in-situ reacted with metal complex catalyst precursor to prepare final supported catalyst. Or the activator can be isolated by filtration, washing with toluene and isohexane, and drying under vacuum.

Catalyst Preparation

The above isolated activator (6.48 g) was re-slurried in toluene (52 g). To the activator slurry was added 25 wt % toluene solution of bis(1-methyl-3-butylcyclopentadienyl)zirconium dichloride (483 mg, Albemarle Corporation product). After addition the mixture was stirred at ambient temperature for 2 hours. The yellow solid was then filtered. The solid on the filter was washed twice with toluene (10 g) and with isohexane (10 g) three times, and then dried under vacuum for 1 hour at ambient temperature. A yellow solid powder (6.50 g) was obtained. Elemental analysis of the powder by ICP: Al 15.21 wt %; Zr 0.38 wt %; Mg 1.22 wt %. Ethylene/1-hexene copolymerization results of the catalyst are provided in Table 1.

Example 4

Tetrakis(Dimethylamino)Titanium, [Ti(NMe$_2$)$_4$] Linker

Activator Preparation

In a drybox with a $N_2$ atmosphere, silica gel (5.0 g, dehydrated at 150° C. for 4 hours, ES767, PQ Corp.) was mixed with toluene (75 g) and heated at 60° C. under agitation. [Ti(NMe$_2$)$_4$] (1.0 g, Strem, as 50 wt % in toluene) and 1,3,5-trimethyl-2,4,6-tris(3,5-di-tert-butyl-4-hydroxybenzyl)-benzene (ETHANOX 330, 1.2 g) were added followed by stirring for 30 minutes after each addition. The mixture was cooled to ambient temperature and filtered. The solid collected was washed with toluene (2×25 g), isohexane (2×25 g), and dried under vacuum (6.2 g isolated). Some of the solid (5.8 g) was subsequently mixed under agitation with toluene (73 g) and heated to 65° C. under agitation. E330 (1.7 g) and methylaluminoxane (MAO, 13.4 g, 30 wt % solution in toluene, product of Albemarle Corporation) were added to the mixture while stirring. When the addition of MAO was complete, the mixture was allowed to react at room temperature for 30 minutes, at 110° C. for 4 hours, followed by cooling to ambient.
Catalyst Preparation To the above final activator mixture was added bis(1-methyl-3-butylcyclopentadienyl)zirconium dichloride (0.36 g of a 25 wt % solution in toluene, Albemarle Corporation product). The mixture was stirred at ambient temperature for 2 hours and filtered. The collected solid was washed with toluene (2×10 g), isohexane (3×10 g) and dried under vacuum (9.7 g). Elemental analysis of the dry powder by ICP: Al 14.7 wt %; Zr 0.18 wt %; Ti 1.9 wt %. Ethylene/1-hexene copolymerization results of the catalyst are provided in Table 1.

Example 5

Pentakis(Dimethylamino)Tantalum, [Ta(NMe$_2$)$_5$], Linker

Activator Preparation

In a drybox with a N$_2$ atmosphere, silica gel (5.0 g, dehydrated at 150° C. for 4 hrs, ES767, PQ Corp.) was mixed with toluene (92 g) and heated at 60° C. under agitation. [Ta(NMe$_2$)$_5$] (1.8 g, Strem, as 50 wt % in toluene) and 1,3,5-trimethyl-2,4,6-tris(3,5-di-tert-butyl-4-hydroxybenzyl)-benzene (ETHANOX 330, 1.5 g) were added followed by stirring for 30 minutes after each addition. The mixture was cooled to ambient temperature and filtered. The solid collected was washed with toluene (2×25 g), isohexane (3×25 g), and dried under vacuum (6.2 g isolated). The solid (6.2 g) was subsequently mixed under agitation with toluene (69 g), E330 (1.0 g), and methylaluminoxane (MAO, 8.5 g, 30 wt % solution in toluene, product of Albemarle Corporation). When the addition of MAO was complete, the mixture was allowed to react at room temperature for 30 minutes, at 110° C. for 4 hours, followed by cooling to ambient.
Catalyst Preparation To the above final activator mixture was added bis(1-methyl-3-butylcyclopentadienyl)zirconium dichloride (0.64 g, 25 wt % toluene solution, Albemarle Corporation product). The mixture was stirred at ambient temperature for 3 hours and filtered. The collected solid was washed with toluene (2×10 g), isohexane (3×10 g) and dried under vacuum (8.6 g). Elemental analysis of the dry powder by ICP: Al 10.8 wt %; Zr 0.03 wt %; Ta 6.9 wt %. Ethylene/1-hexene copolymerization results of the catalyst are provided in Table 1.

Comparative Example 6

No Linker/Polyfunctional Compound

In a drybox with a N$_2$ atmosphere, 30 wt % MAO solution (7.292 g, product of Albemarle Corporation) is slowly added into a 20-mL vial containing 25 wt % bis(1-methyl-3-butylcyclopentadienyl)zirconium dichloride solution (0.617 g). The mixture solution was agitated at ambient temperature for 1 hour. Calcined P10 20 silica (calcined at 160 C for 2 hours, Fuji Silysia Chemical Ltd.) was slurried in 27 mL dry toluene in a round bottom flask. Under agitation of the silica slurry, the MAO-activated metallocene solution was added slowly into the silica slurry. After addition, the mixture was agitated at ambient temperature for 3 hours. The yellow powder was filtered, washed with toluene twice and then isohexane three times. The final pale yellow catalyst was obtained after vacuum drying at ambient temperature for 2 hours. Elemental analysis of the dry powder by ICP: Al 11.40 wt %; Zr 0.40 wt %.
Polymerization Conditions:
Polymer Condition 1:

Charge about 1800 mL of isobutane as solvent to a 4-L reactor. Then 1 mL of 10 wt % triisobutylaluminum (TIBA) in hexane is added as scavenger. There is no pre-contact of catalyst with scavenger. After the addition of isobutane and scavenger, 50 mL of 1-hexene is injected as comonomer. The reactor temperature is then brought to 85° C. and ethylene is added to 310 psi. Catalyst (30 mg in 2 mL isohexane) is injected and flushed into reactor with about 200 mL of isobutane. Temperature and pressure is adjusted to 85° C. and 320 psi, respectively. The polymerization reaction is carried out for 60 minutes. Resin is collected after venting and cooling the reactor. Resin is obtained after drying under vacuum at 65° C.
Polymer Condition 2:

Parallel pressure reactors (PPR) are first baked at 100° C. and purged for 8 hours prior to use. After the reactors are pressure tested, monomer (C2) is flushed through the reactors a minimum of 6 times. The reactors are then charged with scavenger (5 μmol, TIBA) and comonomer (100 μliter, 1-hexene) followed by dry n-heptane as reaction solvent. Reactors are brought up to operating pressure (150 psi) and temperature (80° C.). Reactors are allowed to equilibrate at the temperature for 30 minutes. A solution of catalyst and anhydrous isododecane (150 μliters containing 0.1 mg neat catalyst) is injected into each reactor. This is the start of the polymerization run. After 1 hour run, the reaction is quenched with CO$_2$ gas, and the reactors are allowed to cool to ambient temperature and pressure. The vials are removed from each reactor, and the solvent is removed via lab genevac. The resulting resin is weighed and analyzed by, HT-GPC, FT-IR and DSC.

TABLE 1

Summary of Ethylene/1-Hexene Copolymerization Results

| Sample | Productivity[1] [g resin/ (gcat*h)] | Productivity[2] [g resin/ (gcat*h)] | Bulk density (g/cc) | Mw[3] (× 10$^3$) | Mn[3] (× 10$^3$) | PDI[3] |
|---|---|---|---|---|---|---|
| Example 1, DEZ as linker | 4000 | 3150 | 0.36 | 192 | 73 | 2.63 |
| Example 2, BEM as linker | 3900 | 2610 | 0.37 | 192 | 74 | 2.59 |
| Example 3, TMA + BEM as linker | 5500 | 3920 | 0.43 | 197 | 82 | 2.40 |
| Example 4, Ti(NMe$_2$)$_4$ as linker | 2500 | 1560 | 0.47 | 187 | 72 | 2.60 |
| Example 5, Ta(NMe$_2$)$_5$ as linker | 210[4] | 80 | 0.41 | 293 | 115 | 2.55 |
| Comparative sample | 2800 | 1930 | 0.48 | 176 | 68 | 2.59 |

Note:
[1]Under polymerization condition 1.
[2]Under polymerization condition 2.
[3]Resins used for HT-GPC tests were produced under polymerization condition 2.
[4]Cat charge = 300 mg, the rest of polymerization conditions is the same as condition 1.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

As used herein, the term "concurrently" does not imply that the feeds must start at exactly the same time or that they must stop at exactly the same period of time. Rather, the term is used in the sense that during substantially the entire feeding period, the designated feeds are being maintained. It should also be understood that while these concurrent feeds are preferably continuous concurrent feeds, slight interruptions in a feed are acceptable provided that the duration of the interruption is sufficiently small as to cause no material disruption in the reaction. Thus as used herein, the term "concurrently" should be understood to embrace the minor departures just referred to.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A composition comprising an aluminoxane and an activator precursor composition comprising:
   i) a support material in contact with a linking compound, and
   ii) a polyfunctional compound which has at least two aromatic groups in which at least two of said aromatic groups each has at least one polar monoprotic group thereon,
   wherein the linking compound is an organometallic compound, a non-organometallic compound or mixtures thereof, with the proviso that the organometallic compound does not contain aluminum.

2. The composition of claim 1 wherein:
   the support material is silica, alumina, or silica-alumina;
   the polar monoprotic groups of the polyfunctional compound are hydroxy groups, thiol groups, or secondary amino groups.

3. The composition of claim 1 wherein:
   the support material is silica;
   the polar monoprotic groups of the polyfunctional compound are hydroxy groups.

4. The composition of claim 3 wherein the polyfunctional compound is 4,4'-ethylenediphenol, 4,4'-methylenebis(2,6-di(tert-butyl)-phenol), or 1,3,5-trimethyl-2,4,6-tris(3,5-di(tert-butyl)-4-hydroxybenzyl)benzene.

5. The composition of claim 1 wherein the linking compound is an organometallic compound having the formula:

$$MR^1_s Q_{t-s}$$

wherein M represents a metal atom selecting from Mg, Sc, Y, Ti, Zr, Hf, V, Nb, Ta, Zn, B, Ga, In, Sn and mixtures thereof; $R^1$ is optionally the same or different and represents a $C_1$-$C_{20}$ hydrocarbyl group, wherein the beta carbon of the hydrocarbyl group may be replaced by Si; Q represents a hetero-atom or a hetero-atom containing organic group where the heteroatom is directly bonded to M via the heteroatom; t stands for the valence of M and s is a number such that $2 \leq s \leq t$.

6. The composition of claim 5 wherein $MR^1_s Q_{t-s}$ is $MgEt_2$, MgEtBu, MgBu$_2$, MgBuOct, MgOct$_2$, ZnMe$_2$, ZnEt$_2$, or Zr(CH$_2$Ph)$_4$.

7. The composition of claim 2 wherein the linking compound is a non-organometallic compound is represented by the formula:

$$M^1 Q^1_t$$

wherein $M^1$ represents a metal atom selecting from Mg, Al, Sc, Y, Ti, Zr, Hf, V, Nb, Ta, Cr, Mo, W, Mn, Fe, Co, Ni, Cu, Zn, B Ga, In, Al, Si, Ge, Sn, La, Ce, Er, Yb, Lu and mixtures thereof; $Q^1$ may be the same or different and represents a heteroatom or a heteroatom containing organic group where said heteroatom or heteroatom containing group is directly bonded to $M^1$ via the heteroatom; t stands for the valence of $M^1$.

8. The composition of claim 7 wherein $M^1 Q^1_t$ is MgCl$_2$, MgF$_2$, AlCl$_3$, AlF$_3$, SiCl$_4$, SiMeCl$_3$, SiMe$_2$Cl$_2$, Ti(OEt)$_4$, Ti(OBu)$_4$, Ti(NMe$_2$)$_4$, Ta(NMe$_2$)$_5$ or Zr(NMe$_2$)$_4$.

9. The composition of claim 1 wherein the polyfunctional compound is represented by the formula:

$$E(ArJH)_g$$

where E is an organic moiety, an atom, or a bond;
Ar is an aromatic moiety;
J is a polar atom or a polar group;
H is a hydrogen atom; and
g is an integer equal to or greater than 2.

10. The composition of claim 9 wherein the aluminoxane is methylaluminoxane and/or wherein the polyfunctional compound is 4,4'-ethylenediphenol, 4,4'-methylenebis(2,6-di(tert-butyl)-phenol), or 1,3,5-trimethyl-2,4,6-tris(3,5-di(tert-butyl)-4-hydroxybenzyl)benzene.

11. The composition of claim 1, wherein said linker compound further comprises a mixture of an organoaluminum compound with said organometallic compound, or a mixture of an organoaluminum compound with said non-organometallic compound.

* * * * *

UNITED STATES PATENT AND TRADEMARK OFFICE
CERTIFICATE OF CORRECTION

PATENT NO. : 10,221,264 B2
APPLICATION NO. : 14/396915
DATED : March 5, 2019
INVENTOR(S) : Steven P. Diefenbach et al.

Page 1 of 1

It is certified that error appears in the above-identified patent and that said Letters Patent is hereby corrected as shown below:

In the Claims

Claim 7, at Column 32, Line 32, reads "composition of claim 2" and should read -- composition of claim 1 --.

Signed and Sealed this
Seventh Day of May, 2019

Andrei Iancu
*Director of the United States Patent and Trademark Office*